US012242473B2

(12) United States Patent
Naufel

(10) Patent No.: US 12,242,473 B2
(45) Date of Patent: Mar. 4, 2025

(54) GRAPH-BASED NATURAL LANGUAGE PROCESSING (NLP) FOR QUERYING, ANALYZING, AND VISUALIZING COMPLEX DATA STRUCTURES

(71) Applicant: Arizona Board of Regents on Behalf of Arizona State University, Scottsdale, AZ (US)

(72) Inventor: Mark Naufel, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/644,776

(22) Filed: Apr. 24, 2024

(65) Prior Publication Data

US 2024/0362208 A1    Oct. 31, 2024

Related U.S. Application Data

(60) Provisional application No. 63/461,860, filed on Apr. 25, 2023.

(51) Int. Cl.
*G06F 7/00* (2006.01)
*G06F 16/242* (2019.01)
*G06N 20/00* (2019.01)

(52) U.S. Cl.
CPC ........... *G06F 16/243* (2019.01); *G06N 20/00* (2019.01)

(58) Field of Classification Search
CPC .... G06F 16/243; G06F 16/90; G06F 16/2465; G06F 16/2425; G06F 16/28;
(Continued)

(56) References Cited

U.S. PATENT DOCUMENTS 8,412,514 B1    4/2013   Feng et al.
10,275,713 B2    4/2019   Bhat et al.
(Continued)

FOREIGN PATENT DOCUMENTS

WO    2021243903 A1    12/2021

OTHER PUBLICATIONS

Maddigan et al., "Chat2VIS: Generating Data Visualizations via Natural Language Using ChatGPT, Codex and GPT-3 Large Language Models", IEEE Access, vol. 11, IEEE, May 8, 2023, pp. 45181-45193.
(Continued)

*Primary Examiner* — Mohammad A Sana
(74) *Attorney, Agent, or Firm* — Shumaker & Sieffert, P.A.

(57) ABSTRACT

A system with graph-based Natural Language Processing (NLP) for querying, analyzing, and visualizing complex data structures is described. Such a system executes a generalized AI language model; defines and migrates a training dataset into a graph database by exposing data sources to an executing AI language model that self-defines a structure and self-writes an executable script to query the original data sources and self-writes code to load the extracted data into a graph database in the form of new nodes and new relationships with directionality between the nodes. The system further includes means for loading the extracted data into the graph database; condensing the information stored within the graph database into a condensed data structure representing the full architecture of the data in a natural language format; and responding to human language inquiries with responsive text, speech, and visualizations using the data loaded into the graph database.

23 Claims, 14 Drawing Sheets

(58) Field of Classification Search
CPC .. G06F 16/951; G06F 16/9536; G06F 16/367; G06F 16/24522; G06F 16/3329; G06N 20/00; G06N 3/105; G06N 3/044; G06N 3/082

See application file for complete search history.

(56) References Cited

U.S. PATENT DOCUMENTS

| | | | |
|---|---|---|---|
| 2017/0358234 A1 | 12/2017 | Bohlen et al. | |
| 2018/0075770 A1 | 3/2018 | Falash et al. | |
| 2021/0124782 A1 | 4/2021 | Karaca et al. | |
| 2021/0158714 A1 | 5/2021 | Bohlen et al. | |
| 2021/0279553 A1* | 9/2021 | Zhu | G06N 3/105 |
| 2021/0287800 A1* | 9/2021 | Ghosh | G16H 10/60 |
| 2022/0138193 A1 | 5/2022 | Xu et al. | |
| 2022/0139245 A1 | 5/2022 | Wilson et al. | |
| 2022/0310083 A1 | 9/2022 | Mohanty et al. | |
| 2022/0414228 A1 | 12/2022 | Difonzo et al. | |
| 2022/0415199 A1 | 12/2022 | Venkatasubramanyam | |
| 2023/0061906 A1 | 3/2023 | Gaur et al. | |
| 2023/0281486 A1* | 9/2023 | Varro | G06F 30/27 706/11 |
| 2024/0012953 A1* | 1/2024 | Varro | G06F 30/10 |
| 2024/0054909 A1 | 2/2024 | Rushkin et al. | |
| 2024/0146563 A1 | 5/2024 | Sheth | |
| 2024/0160955 A1* | 5/2024 | Zhao | G06N 5/01 |
| 2024/0161648 A1 | 5/2024 | Davies et al. | |

OTHER PUBLICATIONS

Zhu et al., "A natural language interface to a graph-based bibliographic information retrieval system", Data & Knowledge Engineering, vol. 111, Elsevier, Sep. 1, 2017, pp. 73-89.

Office Action from U.S. Appl. No. 18/661,040 dated Aug. 20, 2024, 9 pp.

U.S. Appl. No. 18/661,040, filed May 10, 2024, naming inventors Naufel et al.

Bonner et al., "Large Language Model-Based Artificial Intelligence in the Language Classroom: Practical Ideas for Teaching", Teaching English with Technology, vol. 23, No. 1, pp. 23-41, Retrieved from the Internet on Oct. 7, 2024 from URL: https://files.eric.ed.gov/fulltext/EJ1383526.pdf.

International Search Report and Written Opinion of International Application No. PCT/US2024/026210 dated Aug. 22, 2024, 19 pp.

Notice of Allowance from U.S. Appl. No. 18/661,040 dated Dec. 11, 2024, 5 pp.

Response to Office Action dated Aug. 20, 2024 from U.S. Appl. No. 18/661,040, filed Nov. 20, 2024, 17 pp.

* cited by examiner

GRAPH-BASED NATURAL LANGUAGE PROCESSING (NLP) FOR QUERYING, ANALYZING, AND VISUALIZING COMPLEX DATA STRUCTURES

CLAIM OF PRIORITY

This application is a track one utility application of U.S. Provisional Patent Application No. 63/461,860, filed 25 Apr. 2023, the entire contents of which is incorporated herein by reference.

TECHNICAL FIELD

Embodiments of the invention relate generally to the field of artificial intelligence (AI) and database technology, and more particularly, to systems, methods, and apparatuses for implementing graph-based Natural Language Processing (NLP) for querying, analyzing, and visualizing complex data structures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Within the context of computing, artificial intelligence ("AI," "Ai," or "ai") represents the apparent "intelligence" demonstrated by computing machines, as opposed to the natural "intelligence" of humans and other animals. Artificial intelligence generally includes many sub-tasks and sub-disciplines, such as speech recognition, computer vision, language translation, and complex input mapping and data correlations, which very often overwhelm human intelligence.

In modern times, artificial intelligence applications are commonplace, and include tools such as modern web search engines, content or product recommendation systems, human speech recognition systems, gaming engines and gaming playing AI models, as well as trained artificial intelligence models capable of generating completely new and never before seen music, lyrics, poetry, and even photorealistic visual "AI art."

Natural Language Processing ("NLP") is a subfield of artificial intelligence that focuses on enabling computers to understand, interpret, and generate human language. Exemplary NLP systems handle tasks including expert translation between languages, analyzing and identifying "sentiment," and general information extraction and summarization. Such NLP systems typically utilize machine learning models as part of their "training," including application of deep learning via neural networks, to capture and learn the complex patterns and structures represented within human language.

SUMMARY

In general, this disclosure is directed to systems, methods, and apparatuses for implementing graph-based Natural Language Processing (NLP) for querying, analyzing, and visualizing complex data structures. Certain embodiments expand upon a contextualized Generative Pre-trained Transformer (GPT-x) through the use of improved Extract, Transform, Load (ETL) processing for extracting data from various sources. Other embodiments implement a feedback loop which is specially configured to improve query accuracy by learning from known errors and user feedback. In yet other embodiments, the system utilizes a combination of improved Natural Language Processing (NLP), improved machine learning methodologies, and improved graph database technologies for enabling users to efficiently explore, analyze, and/or visualize interconnected data, uncovering hidden patterns, trends, and insights.

The described embodiments are applicable across a wide range of industries, such as healthcare, finance, and scientific research, and demonstrate versatility in addressing diverse data analysis and visualization needs. By providing a user-friendly, scalable, and adaptable framework, the disclosed system further supports integration with popular business intelligence tools, custom data pipelines, real-time analytics, and advanced data management features, ensuring compliance with industry regulations and best practices. With a focus on extensibility and customization, the disclosed system empowers users to make informed decisions based on their data, thus promoting data-driven decision-making and actions.

Previously available data management and visualization tools typically requires users to have specific query language knowledge or programming skills. Moreover, such tools lack flexibility and user-friendly interfaces, which in turn, creates barriers for novice users lacking specialized technical expertise.

The field of data management, analysis, and visualization has evolved significantly in recent years, with the emergence of new technologies and methodologies aimed at addressing the growing complexity and scale of data. Notwithstanding such recent advances, presently available technologies, such as relational databases and structured query languages, place a high burden upon users seeking to query for and analyze data stored by such systems. Further still, even with technical expertise and access to state-of-the-art tools, the task of handling, manipulating, querying, and analyzing complex, interconnected, and semi-structured data remains difficult at best and often practically infeasible or impossible at worst.

While certain data management and visualization tools are available to the marketplace today, such tools require users to have specific technical expertise, via which to construct and execute syntactically correct "queries" or programming skills to interface with databases and information storage systems. Thus, while such tools can be very powerful, they lack flexibility and user-friendly interfaces, resulting in significant technical barriers for non-technical users.

Prior known techniques for simplifying access to complex data storage systems have failed to sufficiently handle complex, interconnected, and semi-structured data, thus limiting their usefulness and scalability.

This disclosure describes techniques that address the growing complexity and scale of data and that are specifically adapted to provide access to information stored within complex, interconnected, and semi-structured data repositories without requiring a high degree of technical expertise or programming knowledge to access such data.

The present state of the art may therefore benefit from the systems, methods, and apparatuses for implementing graph-based Natural Language Processing (NLP) for querying, analyzing, and visualizing complex data structures, as is described herein In at least one example, processing circuitry is configured to perform a method. Such a method may include processing circuitry executing an AI language model. In such an example, processing circuitry may specify data for training the AI language model available from one or more original data sources. The processing circuitry may migrate the data specified for training the AI language model from the one or more original data sources into a graph database by exposing the one or more original data sources to the AI language model and performing at least the following data migration operations: determining, via the AI language model, a data structure for the graph database; generating, via the AI language model, an executable query script having self-written code to extract the data from the one or more original data sources exposed to the AI language model; executing the executable query script to extract the data from the one or more original data sources; generating, via the AI language model, an executable load script having self-written code to load the data extracted from the one or more original data sources into the data structure of the graph database as new nodes and new relationships with directionality between the new nodes and having metadata parameters within the new nodes describing the data loaded into the graph database; executing the executable load script to load the data extracted from the one or more original data sources into the graph database. Subsequent to loading the data into the graph database, processing circuitry may further be configured to perform method operations including condensing the data stored within the graph database into a condensed data structure representing a full architecture of the data in a natural language format by performing at least the following data condensing operations: querying the graph database to obtain information on the new nodes, the new relationships, and the metadata parameters within the graph database; providing as input to the AI language model, the information on the new nodes, the new relationships, and the metadata parameters; and responsive to providing as input to the AI language model, the information on the new nodes, the new relationships, and the metadata parameters, generating as output from the AI language model, the condensed data structure. Such a method may further include processing circuitry receiving a question as user-input in natural human language. The processing circuitry may execute the AI language model to determine a user-intent from the user-input. In such an example, processing circuitry executes the AI language model to generate a structured data query contextualized against the condensed data structure based on the determined user-intent. Processing circuitry may execute the structured data query against the graph database. Processing circuitry may further be configured to perform method operations including returning output in a structured format to a user-device having originated the user-input.

In at least one example, a system includes processing circuitry; non-transitory computer readable media; and instructions that, when executed by the processing circuitry, configure the processing circuitry to perform operations. In such an example, processing circuitry may configure the system to specify data for training the AI language model available from one or more original data sources. The processing circuitry may migrate the data specified for training the AI language model from the one or more original data sources into a graph database by exposing the one or more original data sources to the AI language model and performing at least the following data migration operations: determining, via the AI language model, a data structure for the graph database; generating, via the AI language model, an executable query script having self-written code to extract the data from the one or more original data sources exposed to the AI language model; executing the executable query script to extract the data from the one or more original data sources; generating, via the AI language model, an executable load script having self-written code to load the data extracted from the one or more original data sources into the data structure of the graph database as new nodes and new relationships with directionality between the new nodes and having metadata parameters within the new nodes describing the data loaded into the graph database; executing the executable load script to load the data extracted from the one or more original data sources into the graph database. Subsequent to loading the data into the graph database, processing circuitry of the system may further be configured to condense the data stored within the graph database into a condensed data structure representing a full architecture of the data in a natural language format by performing at least the following data condensing operations: querying the graph database to obtain information on the new nodes, the new relationships, and the metadata parameters within the graph database; providing as input to the AI language model, the information on the new nodes, the new relationships, and the metadata parameters; and responsive to providing as input to the AI language model, the information on the new nodes, the new relationships, and the metadata parameters, generating as output from the AI language model, the condensed data structure. Such a system may further include processing circuitry configured to receive a question as user-input in natural human language. The processing circuitry may execute the AI language model to determine a user-intent from the user-input. In such an example, processing circuitry executes the AI language model to generate a structured data query contextualized against the condensed data structure based on the determined user-intent. Processing circuitry may execute the structured data query against the graph database. Processing circuitry may further be configured to cause the system to return output in a structured format to a user-device having originated the user-input.

In one example, there is computer-readable storage media having instructions that, when executed, configure processing circuitry to specify data for training the AI language model available from one or more original data sources. The processing circuitry may migrate the data specified for training the AI language model from the one or more original data sources into a graph database by exposing the one or more original data sources to the AI language model and performing at least the following data migration operations: determining, via the AI language model, a data structure for the graph database; generating, via the AI language model, an executable query script having self-written code to extract the data from the one or more original data sources exposed to the AI language model; executing the executable query script to extract the data from the one or more original data sources; generating, via the AI language model, an executable load script having self-written code to load the data extracted from the one or more original data sources into the data structure of the graph database as new nodes and new relationships with directionality between the new nodes and having metadata parameters within the new nodes describing the data loaded into the graph database; executing the executable load script to load the data extracted from the one or more original data sources into the graph database. Subsequent to loading the data into the graph database, processing circuitry may further be configured to condense the data stored within the graph database into a condensed data structure representing a full architecture of the data in a natural language format by performing at least the following data condensing operations: querying the graph database to obtain information on the new nodes, the new relationships, and the metadata parameters within the graph database; providing as input to the AI language model, the information on the new nodes, the new relationships, and the metadata parameters; and responsive to providing as input to the AI language model, the information on the new nodes, the new relationships, and the metadata parameters, generating as output from the AI language model, the condensed data structure. Processing circuitry may be configured to receive a question as user-input in natural human language. The processing circuitry may execute the AI language model to determine a user-intent from the user-input. In such an example, processing circuitry executes the AI language model to generate a structured data query contextualized against the condensed data structure based on the determined user-intent. Processing circuitry may execute the structured data query against the graph database. Processing circuitry may further be configured to cause the processing circuitry to return output in a structured format to a user-device having originated the user-input.

The details of one or more examples of the disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the text and figures.

DETAILED DESCRIPTION

Figure 1:
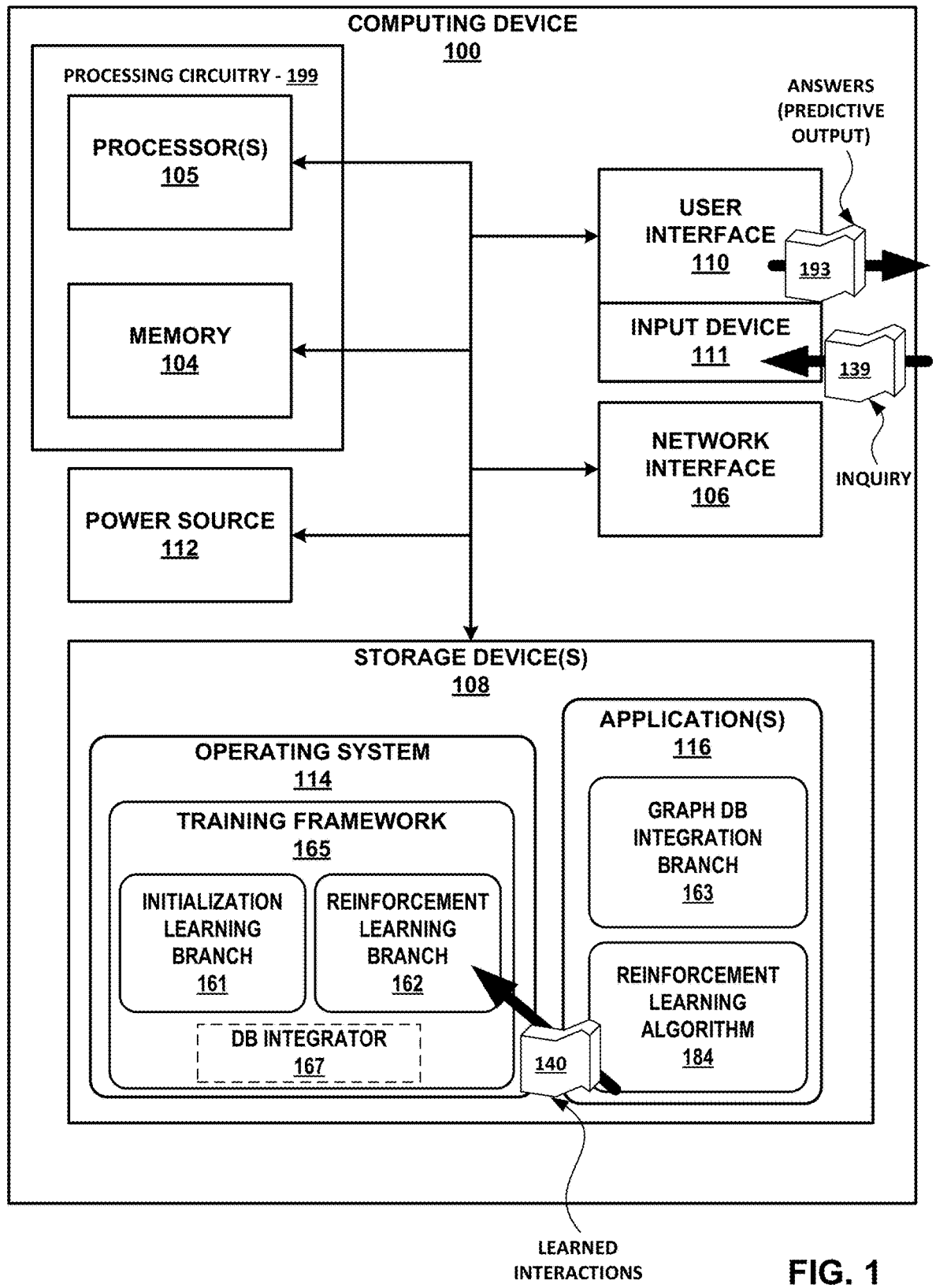
FIG. 1 is a block diagram illustrating further details of one example of computing device, in accordance with aspects of the disclosure.

Described herein are systems, methods, and apparatuses for implementing graph-based Natural Language Processing (NLP) for querying, analyzing, and visualizing complex data structures.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general-purpose computer selectively activated, and thus in-situ specially configured, or specially reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various special purpose and specially customized systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 is a block diagram illustrating further details of one example of computing device, in accordance with aspects of this disclosure. FIG. 1 illustrates only one particular example of computing device 100. Many other example embodiments of computing device 100 may be used in other instances.

As shown in the specific example of FIG. 1, computing device 100 may include processing circuitry 199 including one or more processors 105 and memory 104. Computing device 100 may further include network interface 106, one or more storage devices 108, user interface 110, and power source 112. Computing device 100 may also include an operating system 114. Computing device 100, in one example, may further include one or more applications 116, such as graph database (DB) integration branch 163 and reinforcement learning algorithm 184. One or more other applications 116 may also be executable by computing device 100. Components of computing device 100 may be interconnected (physically, communicatively, and/or operatively) for inter-component communications.

Operating system 114 may execute various functions including executing a trained AI model and performing AI model training. As shown here, operating system 114 executes training framework 165 which includes both initialization learning branch 161 and reinforcement learning branch 162. Reinforcement learning branch 162 may receive as input learned interactions 140 as provided by reinforcement learning algorithm 184 as output. Training framework 165 further includes database (DB) integrator 167 to integrate newly learned interactions into an earlier trained AI model using reinforcement learning techniques.

Computing device 100 may implement a fully configured GPT system for data cleansing and augmentation specially configured to perform the operations and methodologies described herein. Computing device 100 may receive an inquiry 139 via input device 111 and provide inquiry 139 to training framework 165 executing via operating system 114. Computing device 100 may provide answers (e.g., predictive output) 193 as output to a connected user device via user interface 110.

In some examples, processing circuitry including one or more processors 105, implements functionality and/or process instructions for execution within computing device 100. For example, one or more processors 105 may be capable of processing instructions stored in memory 104 and/or instructions stored on one or more storage devices 108.

Memory 104, in one example, may store information within computing device 100 during operation. Memory 104, in some examples, may represent a computer-readable storage medium. In some examples, memory 104 may be a temporary memory, meaning that a primary purpose of memory 104 may not be long-term storage. Memory 104, in some examples, may be described as a volatile memory, meaning that memory 104 may not maintain stored contents when computing device 100 is turned off. Examples of volatile memories may include random access memories (RAM), dynamic random-access memories (DRAM), static random-access memories (SRAM), and other forms of volatile memories. In some examples, memory 104 may be used to store program instructions for execution by one or more processors 105. Memory 104, in one example, may be used by software or applications running on computing device 100 (e.g., one or more applications 116) to temporarily store data and/or instructions during program execution.

One or more storage devices 108, in some examples, may also include one or more computer-readable storage media. One or more storage devices 108 may be configured to store larger amounts of information than memory 104. One or more storage devices 108 may further be configured for long-term storage of information. In some examples, one or more storage devices 108 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 100, in some examples, may also include a network interface 106. Computing device 100, in such examples, may use network interface 106 to communicate with external devices via one or more networks, such as one or more wired or wireless networks. Network interface 106 may be a network interface card, such as an Ethernet card, an optical transceiver, a radio frequency transceiver, a cellular transceiver or cellular radio, or any other type of device that can send and receive information. Other examples of such network interfaces may include BLUETOOTH®, 3G, 4G, 1G, LTE, and WI-FI® radios in mobile computing devices as well as USB. In some examples, computing device 100 may use network interface 106 to wirelessly communicate with an external device such as a server, mobile phone, or other networked computing device.

User interface 110 may include one or more input devices 111, such as a touch-sensitive display. Input device 111, in some examples, may be configured to receive input from a user through tactile, electromagnetic, audio, and/or video feedback. Examples of input device 111 may include a touch-sensitive display, mouse, keyboard, voice responsive system, video camera, microphone or any other type of device for detecting gestures by a user. In some examples, a touch-sensitive display may include a presence-sensitive screen.

User interface 110 may also include one or more output devices, such as a display screen of a computing device or a touch-sensitive display, including a touch-sensitive display of a mobile computing device. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output devices may include a speaker, a cathode ray tube (CRT) monitor, a liquid crystal display (LCD), or any other type of device that can generate intelligible output to a user.

Computing device 100, in some examples, may include power source 112, which may be rechargeable and provide power to computing device 100. Power source 112, in some examples, may be a battery made from nickel-cadmium, lithium-ion, or other suitable material.

Examples of computing device 100 may include operating system 114. Operating system 114 may be stored in one or more storage devices 108 and may control the operation of components of computing device 100. For example, operating system 114 may facilitate the interaction of one or more applications 116 with hardware components of computing device 100.

Figure 2:
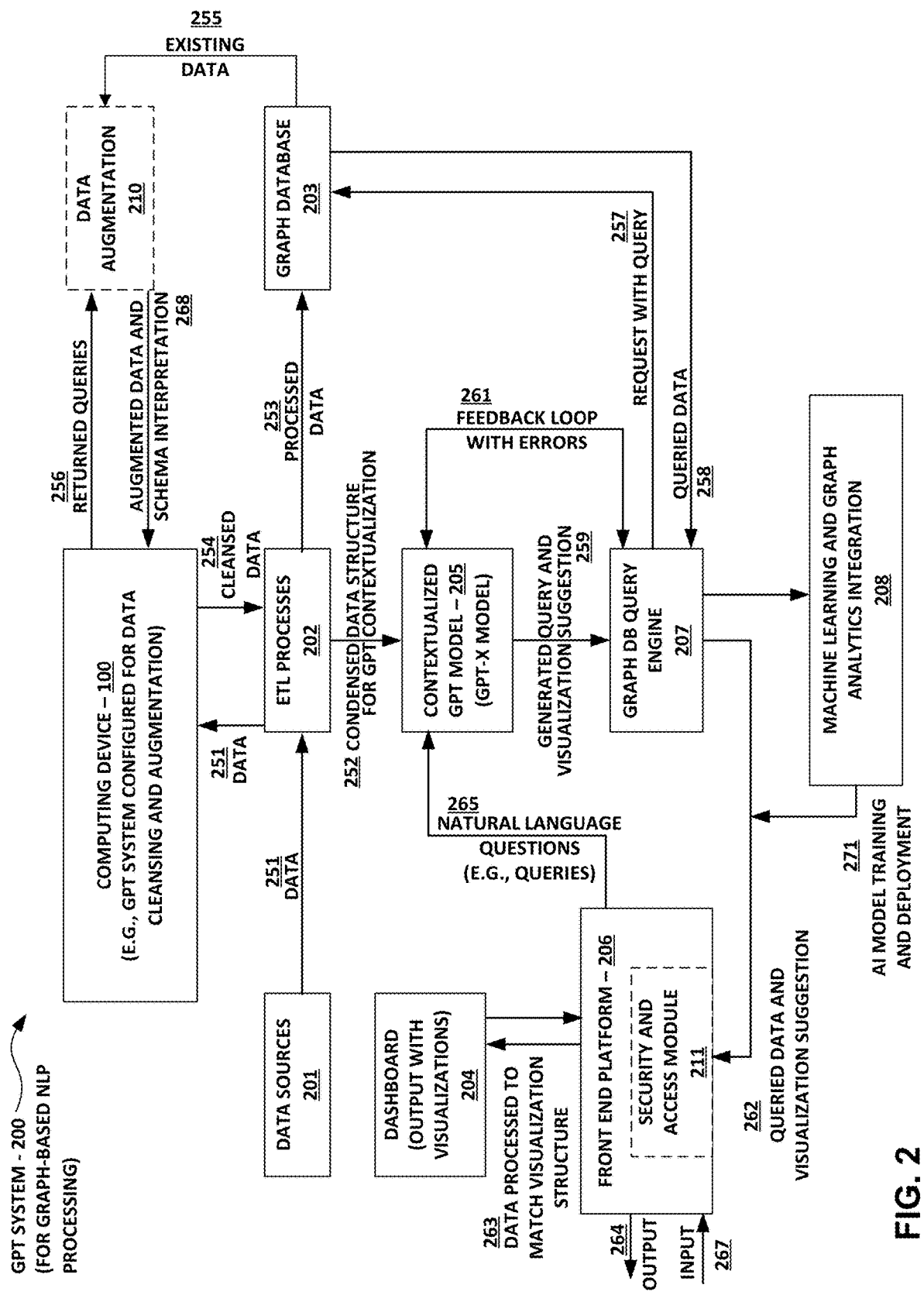
FIG. 2 illustrates a GPT system 200 for graph-based Natural Language Processing (NLP) performed utilizing computing device 100 configured for querying, analyzing, and/or visualizing complex data structures, in accordance with aspects of the disclosure.

FIG. 2 illustrates a GPT system 200 for graph-based Natural Language Processing (NLP) performed utilizing computing device 100 configured for querying, analyzing, and/or visualizing complex data structures, in accordance with aspects of the disclosure.

FIG. 2 depicts how an AI-based Natural Language Data Query and Visualization System (e.g., GPT system 200) provides a comprehensive and innovative solution designed to enable users to efficiently query, analyze, and visualize complex data structures using natural language. The system incorporates advanced technologies, some of which have only recently been made available (e.g., via GPT, as of 2021), and integrates various components to address the limitations of traditional data query and visualization tools. By leveraging these technologies, the system offers a more powerful and efficient solution for data management, analysis, and visualization. This Systems Overview section provides a high-level description of the main components and their interactions within the system.

Computing device 100 is shown here as a GPT system 200 configured for data cleansing and augmentation. More particularly, computing device 100 represents a GPT model specifically configured to assist with data cleansing during ETL Processes 202 and to help with data augmentation 210 when requested by user through data augmentation processes 210. ETL processes 202 forms part of the AI-based Natural Language data query and visualization system (GPT system 200) responsible for extracting, transforming, and loading data from various data Sources 201 into graph database 203.

Optionally provided data augmentation processes 210 will, when requested by the user, work with the configured GPT system as implemented by computing device 100 to understand the context of the request for data augmentation, retrieve relevant existing data from graph database 203, iterate through this data, and provide the query language needed to import it into existing data 255 structure. Graph database 203, via which processed data 253 from ETL processes 202 is stored, enables efficient querying and analysis of complex, interconnected data structures.

For example, computing device 100 may implement a specially configured GPT system 200 for data cleansing and augmentation. Data sources 201 provide raw data 251 for processing by computing device 100, which may include various formats and types, such as structured or unstructured data. ETL Processes 202 perform operations including extracting, transforming, and loading data 251 from data sources 201 into computing device 100. ETL processes 202 may produce a condensed data structure for GPT contextualization 252 and processed data 253, each of which are then imported into graph database 203. ETL Processes 202 interact with computing device 100 for data cleansing and data Augmentation to perform data cleansing processes resulting in cleansed data 254.

ETL processes 202 provides condensed data structure for GPT contextualization 252 into contextualized GPT model 205 which in turn provides generated query and visualization suggestion 259 into graph DB query engine 207. Graph DB query engine 207 interacts with graph database 203 via the exchange of requests with queries 257 and queried data 258 which is returned by graph database 203 to graph DB query engine 207.

Graph database 203 may be supplemented with new processed data 253 which is integrated into existing data 255 using data augmentation 210. Data augmentation 210 may provide augmented data and schema interpretation 268 to computing device 100. Data augmentation 210 may receive returned queries 256 from computing device 100. Graph database 203 may further interact with graph database query engine 207 to receive requests with query 257 and return back queried data 258.

Contextualized GPT model 205 and graph database query engine 207 interact with one another to create feedback loop with errors 261. Graph database query engine 207 may interact with machine learning and analytics integration 208 to generate and provide queried data and visualization suggestion 262 to front end platform 206. Contextualized GPT model 205 processes the Natural Language Queries 265 received from frontend platform 206 and sends generated query and visualization suggestion 259 (e.g., a graph DB query) to graph DB querying engine 207. Graph DB querying engine 207 sends the graph DB query received from contextualized GPT model 205 to graph database 203 as request with query 257 and retrieves or receives back queried data 258. If querying engine 207 generates an error, this error, referred to as a "known error" is sent to contextualized GPT model 205, which has a particular model for error correction utilizing feedback loop with errors 261. Contextualized GPT model 205, responsive to the error, re-generates query and visualization suggestion 259 as a new or modified query which is sent back to graph database 203. This process loops or repeats via feedback loop with errors 261 until data is properly returned responsive to the generated (or re-generated) graph DB query or until the process times out.

An optional machine learning layer may be included for processing queried data. The optional machine learning layer may be configured to pull in additional data as needed to meet the desired user request. The queried data can be sent to this layer for further analysis and insight generation.

Front end platform 206 may optionally include security and access module 211 via which to authenticate and manage access to front end platform 206 graphical interface rendered by dashboard 204 which provides output 264 with visualizations. Front end platform 206 may return data processed to match visualization structure 263 to dashboard 204 and based on the data processed to match visualization structure 263, dashboard 204 may responsively generate and provide output 264 to, for example, a client device or another computing device having submitted an original request or query to computing device 100. Dashboard 204 operates such that queried data and suggested visualization from contextualized GPT model 205 are passed to frontend platform 206, which includes programmed logic to render the returned data as various visualizations and allows users to interact with and manipulate these visualizations to create a modular dashboard 204. In such a way, dashboard 204 provides users with a visual representation of the data and insights, making it easy to understand and interpret.

Security and access module 211 is responsible for ensuring security, access control, and data integrity in the graph-based natural language processing GPT system 200. Security and access module 211 may be integrated into frontend platform 206 and to verify identity of a user before granting access to GPT system 200. Security and access module 211 manages user access based on roles and permissions. A backup and recovery component may optionally be implemented in graph database 203 which operates to ensure data security and recoverability in case of system failure. An audit and logging component may be included in frontend platform 206 for tracking and recording user activity within Security and access module 211.

Front end platform 206 may additionally provide natural language questions 265 to contextualized GPT model 205, based on which contextualized GPT model 205 may provide generated query and visualization suggestion 259 and/or exchange information with graph DB query engine 207 via feedback loop with errors 261. Front end platform 206 allows users to interact with the system by sending natural language queries to contextualized GPT model 205 via an API which accepts natural human language as input. Front end platform 206 may include the authentication, authorization, and audit and logging components as part of security and access module 211.

Natural Language Processing refers to a subset of artificial intelligence that focuses on enabling computers to understand, interpret, and generate human language. Exemplary NLP tasks include language translation, sentiment analysis, and information extraction. Exemplary NLP systems rely on machine learning models, such as deep neural networks, to capture the complex patterns and structures present in human language. Despite recent advances with NLP systems, they remain insufficient with regard to querying and analyzing complex data structures, such as graph databases.

Graph databases are a type of NoSQL database that stores data in the form of nodes, edges, and properties, representing entities, relationships, and attributes. While graph databases 203 enable the storage, retrieval, and analysis of complex, interconnected data, such graph databases rely upon technically complex graph query languages, such as Cypher, Gremlin, or SPARQL, to perform various operations on the data, including pattern matching, traversal, and aggregation. Accordingly, graph databases require users to have a deep understanding of the underlying data model and query language, thus presenting significant barriers to entry for non-technical users.

Presently available data visualization tools enable users to create interactive and informative visual representations of their data. Such tools support a wide range of chart types and provide various customization options to enhance the clarity and aesthetics of the visualizations. However, despite their usefulness, existing visualization tools have failed to bridge the gap between the querying and analyzing of complex data structures with human speech or even NLP systems, thus mandating a high level of technical expertise for users of such data visualization tools.

Prior natural language processing systems fail to accommodate the data explosion growth or the prevalence of information and data stored outside of structured database systems, such as relational databases. Very specifically, there are no known solutions capable of performing queries to and analysis of data stored within graph databases, NoSQL databases, free-form and unstructured data repositories, and other complex and non-structured information storages. There is also an unmet need for data visualization from such data sources, which presents significant technical obstacles, even for technically savvy users of existing data visualization tools. There is a need for user-accessible and user-friendly data analysis tools capable of interacting with complex and unstructured data structures and the repositories of such data.

Thus, described herein is a graph-based natural language processing GPT system 200 that advances and expands upon NLP methodologies to systematically integrate graph database 203 information access, which thus in turn enables both technically sophisticated users and non-technical users to interact with complex and non-structured data using natural language questions/queries 265 to generate insightful visualizations and analysis as output 264, such as that which is depicted by dashboard 204.

Certain examples facilitate such integration through the use of an improved and more advanced and contextualized GPT model 205 (also referred to as a natural language processing model), which yields seamless integration with graph databases 203, supported by the use of novel methodologies to execute a feedback loop with errors 261 which enhances the reliability and accuracy of the system implemented by GPT system 200. The disclosed GPT system 200 and methodologies thus result in a comprehensive, user-friendly, and efficient solution for data management, analysis, and visualization, addressing the limitations and gaps present in the current state of the art.

For instance, the disclosed methodologies exploit synergies which exist between graph databases 203 and the relationships represented within such graph databases 203, which are notably expressed using natural language, thus resulting in a "Large Language Model" or "LLM," such as those utilized by contextualized Generative Pre-trained Transformer or "GPT" type AI models, including GPT-3 and GPT-4 (refer to contextualized GPT model 205 at FIG. 2).

Generally speaking, a large language model ("LLM") is a language model consisting of a neural network with many parameters (e.g., potentially billions of weights) trained on large quantities of unlabeled text using self-supervised learning methodologies.

Computing device 100 may implement a graph-based Natural Language Processing (NLP) system by implementing a hybrid model that combines graph-based and vector-based approaches. Such a hybrid model may append attribute data to the nodes within the graph database, wherein the attribute data includes but is not limited to metadata, context-specific information, or vector embeddings that represent the semantic meaning of the data or its relation to other data points within the graph. Utilizing the appended attributes to augment the retrieval process, may enable such a hybrid model system to perform more nuanced queries that consider both the graph structure and the semantic relationships encapsulated within the vector embeddings of the attribute data, thus allowing for a deeper and more comprehensive exploration and analysis of the data. For instance, such a hybrid model system may leverage an enhanced Retrieval-Augmented Generation (RAG) process to dynamically query, retrieve, and visualize data, facilitating both breadth and depth in data exploration and insights generation, with the capability to address complex user queries that require understanding the interplay between different data points and their attributes. In certain examples, computing device 100 executes the AI language model in conjunction with the hybrid graph/vector-based model to generate structured data queries and predictive outputs that are informed by the enriched data model, providing outputs that reflect a more sophisticated understanding of the query context and user intent, based on the enhanced representation of data within the hybrid model.

A vector space model considers the relationship between data represented by vectors. Such a model is an algebraic model for representing text documents (or more generally, items) as vectors such that the distance between vectors represents the relevance between the documents. It is useful with information filtering, information retrieval, indexing and relevancy rankings. However, it can be limited in terms of semantic comprehension. Conversely, a graph model is a visual representation of complex relationships between entities. Graph models have two main parts: nodes and edges. Nodes are the basic units of a graph, and represent individual entities. Edges are the relationships between nodes, and can be single or directed. Each node-edge-node combination, or "triple", describes a particular fact. A hybrid model combines both concepts into concurrent use providing additional useful information for the AI language model and potentially increasing the sophistication of the hybrid model through increased contextual understanding of human language and incoming natural language requests (e.g., questions asked in human language).

INDUSTRIAL APPLICABILITY

Through the use and practice of the graph-based natural language processing GPT system 200 implemented utilizing computing device 100 and as described herein, even the most novice users are enabled to query, analyze, and visualize complex data structures using artificial intelligence and natural language input questions 265. GPT system 200 provides contextualized GPT model 205 (also referred to as GPT-x model), with the capability to adapt to advancements in GPT technology, to understand and process natural language queries 265 received as input 267. GPT system 200 translates NLP queries 265 into a format suitable for a graph database query language, enabling interaction with graph database 203.

The described capabilities are made available via an API of GPT system 200 which is specially configured to accept natural human language questions/queries 265 as input 267, thus providing an intuitive approach to data management and visualization through the integration of a graph database 203 and the tailoring of a natural language processing model.

GPT system 200 supports various data sources 201, formats, and structures, ensuring compatibility and seamless integration with a diverse set of data types. It also provides a scalable, flexible, and adaptable solution, capable of addressing a wide range of data-related challenges and opportunities in various industries, such as healthcare, finance, scientific research, and marketing.

A feedback loop with errors 261 between contextualized GPT model 205 (e.g., an improved GPT-x model) and graph database querying engine 207 is further provided, such that, when graph database querying engine 207 or compatible trained AI model returns an error, the error information is passed back to contextualized GPT model 205 via its error-feedback model specially trained for refining queries based on the received error information. The error-feedback model may generate a corrected query that avoids the previously encountered error or generate improved model weights which are then transferred into the trained AI model or incorporated into a newly trained model variant. Feedback loop with errors 261 increases the reliability and accuracy of GPT system 200, allowing it to adapt and improve its query generation over time.

GPT system 200 streamlines the data analysis process, offering advanced analytics capabilities, real-time monitoring, and alerting features to empower users to make informed, data-driven decisions. By providing a user-friendly, efficient, and powerful platform, GPT system 200 enables users to harness the power of natural language processing, graph-based data structures, and machine learning technologies to gain valuable insights from their data.

GPT system 200 supports integration with popular business intelligence, analytics, and reporting tools, as well as various machine learning libraries and frameworks. Data security and protection are provided through state-of-the-art encryption, access control, and monitoring mechanisms.

GPT system 200 supports a wide range of use cases and applications across various industries, demonstrating its versatility and adaptability. GPT system 200 provides a comprehensive, modular, and flexible solution, enabling seamless integration with future technological advancements and improvements in the fields of natural language processing, machine learning, and data management.

The commercial potential of an exemplary software as a service (SaaS) product, such as those depicted at FIGS. 8-11 is significant, as organizations across various industries are increasingly recognizing the value of data-driven decision-making and seeking solutions to manage, analyze, and visualize their complex and interconnected data structures. GPT system 200 offers access to a unique value proposition that addresses these market demands and provides a competitive edge in the rapidly growing data analytics and business intelligence market.

There is a growing demand for advanced data management and analysis tools, driven by the increasing availability of data from various sources and the need for organizations to derive actionable insights. Industries such as healthcare, finance, scientific research, marketing, and many others are seeking innovative solutions that can help them navigate and make sense of their data, as well as enable them to make informed decisions that drive business growth and success. The unique features and capabilities of GPT system 200 makes it well-positioned to address this market demand by offering a versatile and user-friendly solution that caters to the diverse data analysis and visualization needs of a wide range of industries.

Testing and evaluation of GPT system 200 has yielded positive feedback on its case of use, powerful natural language processing capabilities, and the ability to visualize and analyze complex data structures using graph-based techniques. Such feedback indicates the case of use resonates with novice-level-users and may thus provide them with a valuable solution to their data management and analysis challenges.

GPT system 200 offers several competitive advantages, as follows. Firstly, the integration of natural language processing and graph-based data structures enables users to intuitively query and visualize their data 251 without the need for specialized technical skills. This empowers a wider range of users within an organization to access and leverage the described features, fostering a more data-driven culture. Secondly, the advanced machine learning and artificial intelligence features of GPT system 200, such as the contextualized GPT model 205/improved GPT-x model, enable users to uncover hidden patterns, trends, and insights within their data 251, providing users with a competitive edge in their decision-making processes. Still further, the flexibility and adaptability of GPT system 200 allows users to tailor computing device 100 to their specific needs, ensuring seamless integration with their existing workflows and tools. This adaptability, coupled with the ability of GPT system 200 to scale and evolve with the requirements of its users, thus yields a long-term, sustainable solution for organizations seeking to harness the power of their data.

In such a way, a highly accessible, efficient, and user-friendly solution for data management, analysis, and visualization is provided through the use of improved natural language processing, graph-based data structures, and specially optimized machine learning methodologies. The disclosed system addresses the complex data analysis and visualization needs of users in various industries and applications, promoting data-driven decision-making and the discovery of valuable insights hidden within complex data structures. With an emphasis on scalability, flexibility, and adaptability, the system offers a powerful and innovative approach to data management and analytics, revolutionizing the way users interact with and understand their data.

According to certain examples, GPT system 200 is specially configured for condensing the information stored within graph database 203 into a condensed data structure for GPT contextualization 252 representing the full architecture of data 251 in a natural language format, in which the condensing includes first querying graph database 203 to retrieve information on all nodes, parameters, and relationships within graph database 203 and secondly, passing the retrieved information on all of the nodes, parameters, and relationships within graph database 203 into an AI language model, which generates as its output, condensed data structure for GPT contextualization 252.

For example, consider the following 'Condensed Articulation of the Data Architecture in Natural Language' below, as follows:

Note that the following is an automatically produced example of output generated by GPT system 200 which is subsequently consumed by GPT system 200 to 'contextualize' the language model to produce syntactically correct queries.

Condensed Schema in Natural Language:

1. Node: City Properties:
name: string
state: string Relationships:
OUTGOING: (City)-[:HAS_PROPERTY] -> (Property)
2. Node: Property Properties:
address: string Relationships:
INCOMING: (City)-[:HAS_PROPERTY] -> (Property)
OUTGOING: (Property)-[:LOCATED IN] -> (Location)

-continued

OUTGOING: (Property)-[:CONTAINS] -> (Unit)
3. Node: Location Properties:
latitude: float
longitude: float Relationships:
INCOMING: (Property)-[:LOCATED_IN] -> (Location)
4. Node: Unit Properties:
bedrooms: int
unit_number: string
square_footage: int
rental_price: float
bathrooms: float Relationships:
INCOMING: (Property)-[:CONTAINS] -> (Unit)
OUTGOING: (Unit)-[:HAS_WORK_ORDER] -> (WorkOrder)
OUTGOING: (Unit)-[:HAS_LEASE] -> (Lease)
5. Node: WorkOrder Properties:
description: string
status: string Relationships:
INCOMING: (Unit)-[:HAS_WORK_ORDER] -> (WorkOrder)
6. Node: Lease Properties:
end_date: date
rental_amount: float
fees: float
start_date: date Relationships:
INCOMING: (Unit)-[:HAS_LEASE] -> (Lease)
OUTGOING: (Lease)-[:HAS_TENANT] -> (Tenant)
7. Node: Tenant Properties:
phone: string
name: string
email: string Relationships:
INCOMING: (Lease)-[:HAS_TENANT] -> (Tenant)
OUTGOING: (Tenant)-[: MAKES_PAYMENT] -> (Payment)
8. Node: Payment Properties:
date: date
amount: float Relationships:
INCOMING: (Tenant)-[:MAKES_PAYMENT] -> (Payment)

Figure 3:
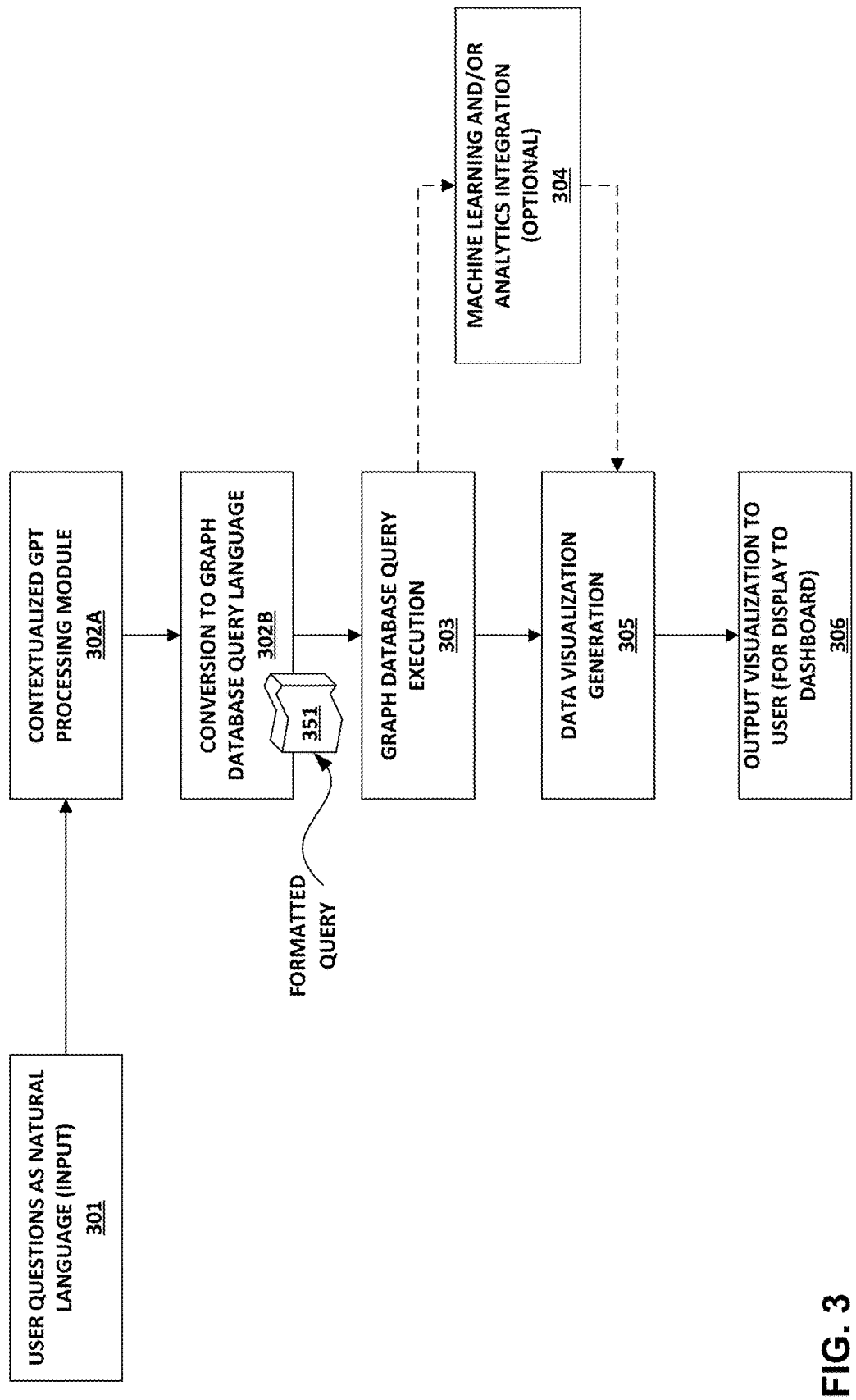
FIG. 3 depicts user interaction flow diagram 300 via which to interact with a graph-based NLP system, in accordance with aspects of the disclosure.

FIG. 3 depicts user interaction flow diagram 300 via which to interact with a graph-based NLP system, in accordance with aspects of the disclosure.

As shown here, a user may present input in the form of user questions as natural language inputs 301, or more simply, a user may ask questions of the system using natural human language constructs. These inputs 301 are passed to block 302A for contextualized GPT processing, which are then in turn passed to block 302B for conversion to graph database query language 302B. Conversion to graph database query language (302B) results in a formatted query being generated as output which is then passed to graph database query execution at block 303. User interaction flow diagram 300 may optionally advance to machine learning and/or analytics integration at block 304. User interaction flow diagram 300 next advances to data visualizations generation at block 305. User interaction flow diagram 300 then advances to output visualization to the user at block 306 which generates display visualizations which are transmitted back to a user for display via, for example, a user computing device.

Figure 4:
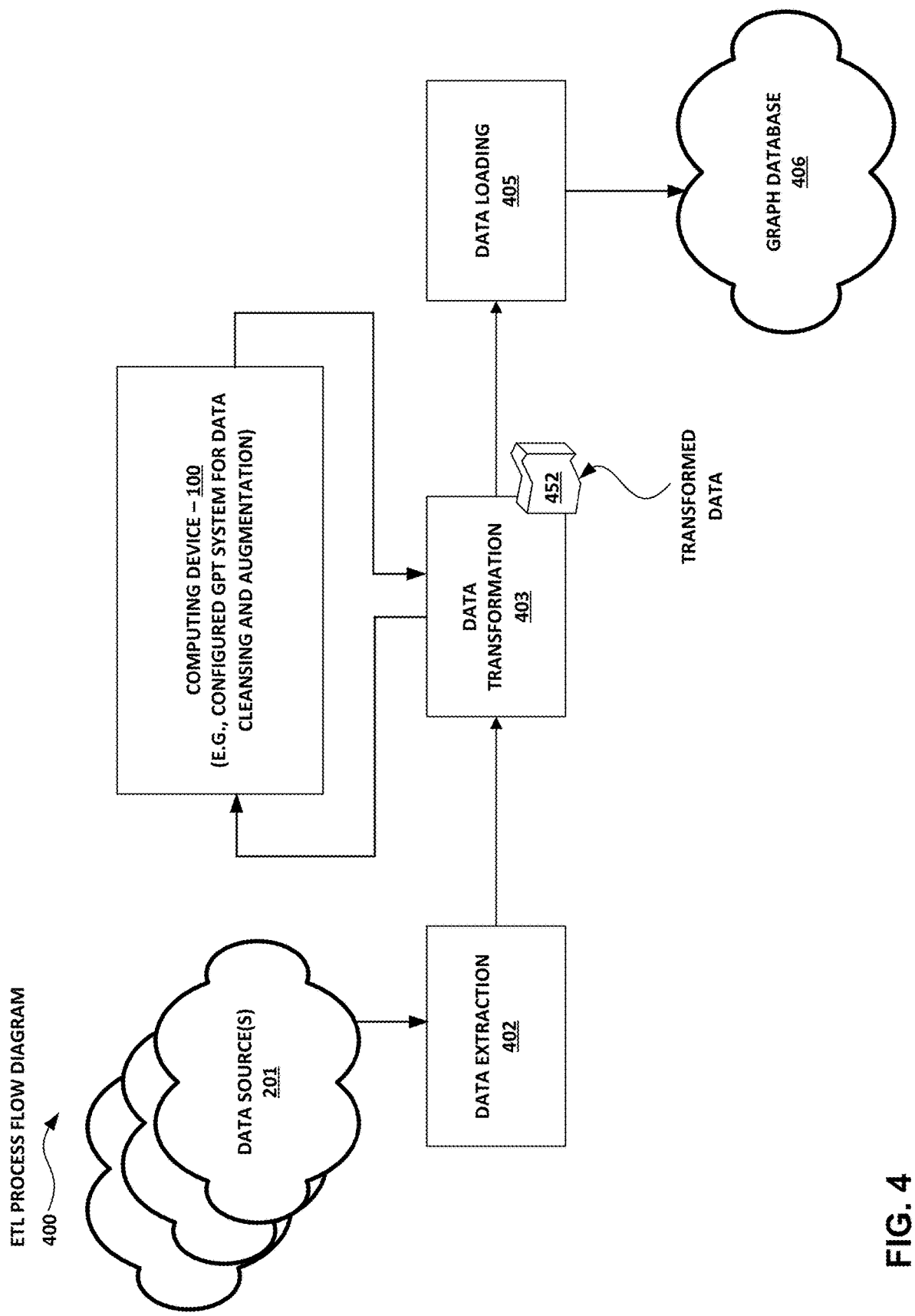
FIG. 4 depicts ETL process flow diagram 400 for implementing Extract, Transform, and Load (ETL) processing, specifically showing how ETL processes migrate data from various sources into graph database 203, in accordance with aspects of the disclosure.

FIG. 4 depicts ETL process flow diagram 400 for implementing Extract, Transform, and Load (ETL) processing, specifically showing how ETL processes migrate data from various sources into graph database 203, in accordance with aspects of the disclosure.

As shown here, data sources 201 (refer also to FIG. 2) provide one or more sources for data extraction 402. Extracted data 451 is passed to data transformation block 403. Transformed data 452 is next passed to data loading block 405. Data loading block 405 loads transformed data 452 into graph database 406 by submitting and persisting the transformed data 452 into graph database 406 for long-term storage and later retrieval. Additionally, computing device 100 configured as a GPT system for data cleansing and augmentation may operate iteratively or continuously to supplement the pre-existing data within graph database 406 with new or updated information.

Figure 5:
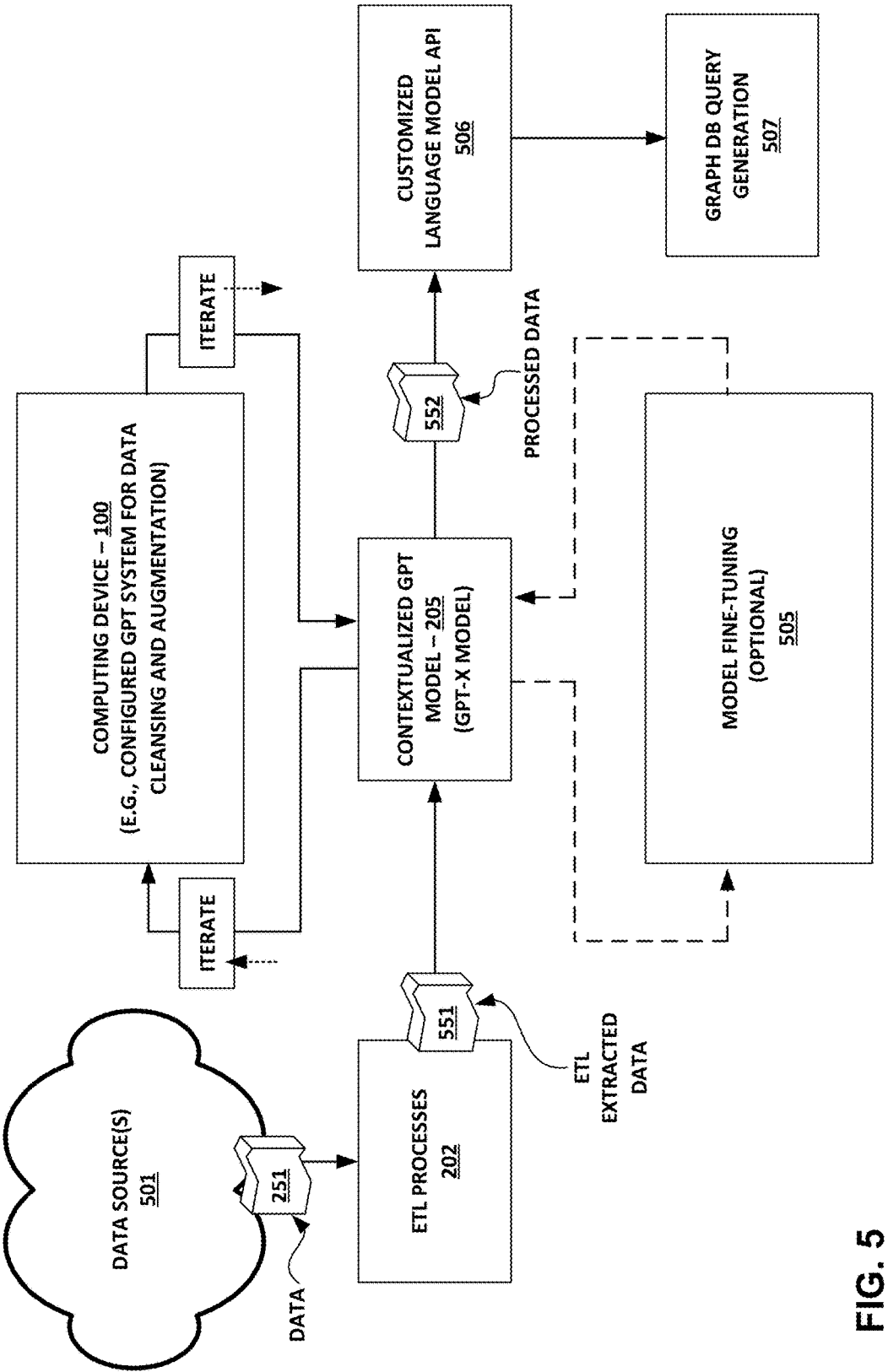
FIG. 5 depicts contextual GPT model flow diagram 500 for implementing a contextualized Generative Pre-trained Transformer ("GPT" type ai model), specifically showing the flow of information between contextualized GPT model 205 (see FIG. 2), frontend platform, and a graph database during query processing, in accordance with aspects of the disclosure.

FIG. 5 depicts contextual GPT model flow diagram 500 for implementing a contextualized Generative Pre-trained Transformer ("GPT" type ai model), specifically showing the flow of information between contextualized GPT model 205 (see FIG. 2), frontend platform, and a graph database during query processing, in accordance with aspects of the disclosure.

As shown here, there are once again, data sources 201 (refer also to FIG. 2) from which data may be extracted using ETL processes 202 (refer also to FIG. 2). ETL extracted data 551 is passed to contextualized GPT model 205 (refer also to FIG. 2). Computing device 100 configured as a GPT system for data cleansing and augmentation may be iteratively applied to ETL extracted data 551 to improve the consistency and usefulness of ETL extracted data 551. Optionally, model fine-tuning 505 may be applied for fine-tuning extracted ETL data 551 and thus improving the training of contextualized GPT model 205.

Processed data 552 is passed from contextualized GPT model 205 to customized language model API 506. Responsive to receipt of processed data 552 at customized language model API 506, processed data 552 is next passed into graph database query generation 507 module.

According to at least one example, ETL processes 202 consists of the following stages:

Data Extraction: In this stage, data 251 (refer also to FIG. 2) is extracted from various data sources 201, such as relational databases, NoSQL databases, APIs, and flat files. Computing device 100 configured as a GTP system for data cleansing and augmentation leverages connectors and adapters to facilitate data extraction from a wide range of data source 201 systems. A contextualized language model API, such as one based on a specially configured contextualized GPT model 205 assists in this process by interpreting user requests in natural language and generating relevant commands or queries for the connectors and adapters. This enables users to interact with the extraction process using intuitive language, simplifying the extraction and reducing the need for specialized knowledge of the source systems.

Data Transformation: Once extracted, data 251 undergoes a series of transformations to ensure compatibility with graph database 203. These transformations include format standardization, data cleansing, and de-duplication. As part of the data cleansing process, computing device 100 employs algorithms to remove duplicates, correct spelling errors, and standardize data formats.

Data Loading: After the transformations are complete, data 251 is loaded into graph database 203. The system employs a batch loading technique to optimize the loading process and ensure efficient migration of data into graph database 203 (refer to FIG. 2).

Figure 6:
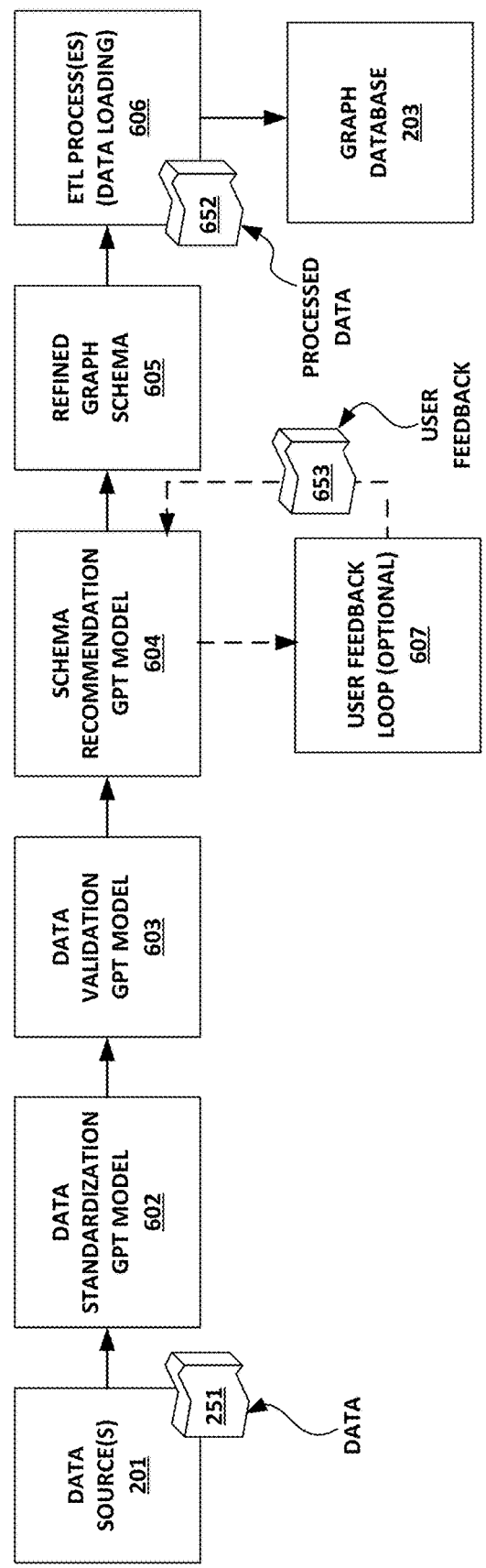
FIG. 6 depicts GPT data cleansing flow diagram 600 implemented by a specially configured GPT system utilized for data cleansing, in which contextualized GPT model 205 facilitates data cleansing during ETL processes 202, in accordance with aspects of the disclosure.

FIG. 6 depicts GPT data cleansing flow diagram 600 implemented by a specially configured GPT system utilized for data cleansing, in which contextualized GPT model 205 facilitates data cleansing during ETL processes 202, in accordance with aspects of the disclosure.

For instance, an AI-based Natural Language data query and visualization system as implemented by computing device 100 employs a series of specially configured and improved contextualized GPT models 205, each configured to drive different aspects of the data cleansing process.

As shown here, GPT data cleansing flow diagram 600 includes one or more data sources 201 (refer also to FIG. 2) which feed into data standardization GPT model 602. GPT data cleansing flow diagram 600 further includes data validation GPT model 603 followed by schema recommendation GPT model 604 which may optionally interact with user feedback loop 607. GPT data cleansing flow diagram 600 further includes refined graph schema 605 followed by ETL process 606 for data loading into graph database 203 (refer also to FIG. 2).

According to one example, GPT data cleansing flow diagram 600 involves at least the following stages:

Data Profiling: A data profiling GPT model conducts an initial assessment of the data to identify potential issues, such as missing values, inconsistencies, and anomalies. This operation helps to pinpoint areas where data cleansing may be required.

As shown here, data sources 201 provide sources from which data 251 (refer also to FIG. 2) may be retrieved, requested, received, or otherwise obtained. Data 251 is passed into data standardization GPT model 602. Data validation GPT model 603 is applied to standardize data 251 and schema recommendation GPT model 604 is utilized to recommend the schema which is passed into refined graph schema 605. Refined graph schema 605 is then passed to ETL processes 606 for data loading into graph database 203. Optionally, a reinforcement learning user feedback loop may be applied via optional user feedback loop 607 in conjunction with operations of the schema recommendation GPT model 604.

Data Standardization: A specially configured data standardization GPT model 602 focuses on standardizing data 251 to ensure uniformity and consistency across the dataset. Data standardization GPT model 602 applies learned representations from training data to intelligently convert new and previously unseen data into a common format, unit, or scale by understanding the contextual relationships between various data points. This standardization process facilitates more accurate data analysis and visualization.

Duplicate Detection and Removal: A specially configured duplicate detection and removal GPT model may employ algorithms to detect and remove duplicate records or values within the dataset, ensuring that the data is unique and accurate.

Error Correction: A specially configured error correction GPT model may correct any identified errors, such as spelling mistakes, typos, and data entry errors. This process applies algorithms and predefined thresholds and rules to identify and rectify errors, which results in the model systematically enhancing the overall quality of processed data 652.

Missing Value Imputation: A specially configured missing value imputation GPT model may correct for missing values within the dataset by employing various imputation techniques, such as mean, median, or mode imputation, or more advanced methods like k-nearest neighbors or regression-based imputation.

Data Validation: A specially configured data validation GPT model may validate the cleaned data to ensure that it meets the required quality standards and is consistent with the original data source 201. This operation may include cross-referencing data 251 with external sources or comparing it with historical data to confirm accuracy and reliability of such data 251.

Schema Recommendation and User Feedback: After the data validation stage, a specially configured schema recommendation GPT model 604 processes the standardized and validated data to recommend an ideal graph schema consisting of nodes, relationships, and properties that best represent the underlying data. By analyzing the inherent relationships and patterns within the data, the model suggests a graph schema that optimizes the data organization for efficient querying and analysis within graph database 203.

Schema recommendation GPT model 604 enables user feedback 653 to be provided into schema recommendation GPT model 604 and iterative refinement of the schema to ensure that it best meets user requirements and expectations. The model facilitates an interactive process that allows users to review the recommended schema, provide feedback, and adjust as needed via optional user feedback loop 607. This user-guided schema refinement helps tailor graph database 203 structure to the user's specific use case and domain knowledge.

Still further, schema recommendation GPT model 603 brings together data 251 from distinct, inconsistent, and otherwise incompatible data sources 201 and maps data 251 via the refined graph schema 605. By understanding the relationships and commonalities between various data sources, schema recommendation GPT model 603 can recommend a unified graph schema that integrates and harmonizes disparate datasets, creating a comprehensive and coherent data structure within graph database 203.

This recommended graph schema, tailored, and adjusted with user feedback 653, is later used during the data loading stage of ETL processes 202 (refer to FIG. 2) to migrate data 251 in bulk into graph database 203. By applying the specially configured GPT system for data cleansing and the schema recommendation GPT model with user feedback 653, the system achieves both the standardization and validation of data 251, as well as the creation of an efficient and user-tailored graph database structure, ultimately enhancing the performance and usability of the AI-based Natural Language data query and visualization system.

Figure 7:
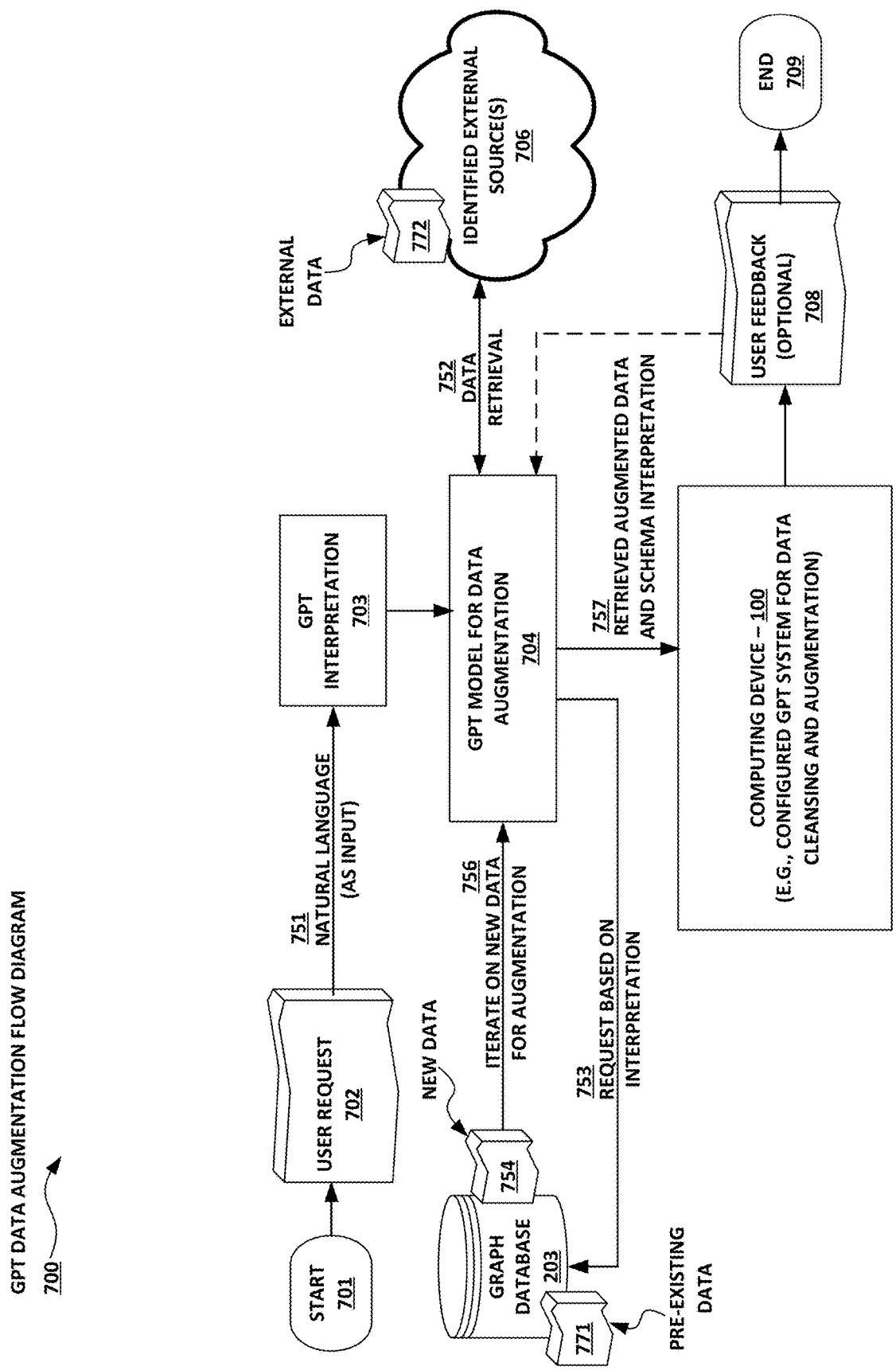
FIG. 7 depicts a GPT data augmentation flow diagram 700, in which the GPT model enriches an existing graph database 203 with relevant external data 772, in accordance with aspects of the disclosure.

FIG. 7 depicts a GPT data augmentation flow diagram 700, in which the GPT model enriches an existing graph database 203 with relevant external data 772, in accordance with aspects of the disclosure.

Specifically shown, beginning at starting block 701, is user request 702, in natural language format 751, provided as input to GPT interpretation 703. GPT interpretation 703 leads to GPT model for data augmentation 704. Data retrieval 752 operations are permitted from identified external sources 706. Requests are provided from GPT model for data augmentation 704 to graph DB 203 (refer also to FIG. 2) via requests based on interpretation 753 to generate new data 754. GPT model for data augmentation 704 then iterates on new data for augmentation 756 for the augmentation of originally provided data or pre-existing data 771. GPT model for data augmentation 704 retrieves augmented data and a schema interpretation 757 which is sent to computing device 100 specially configured as GPT system for data cleansing and augmentation. User feedback 708 may optionally be provided, after which processing ends at block 709.

According to certain examples, GPT model for data augmentation 704 significantly enhances the AI-based natural language data query and visualization system by adding relevant external data 772 to pre-existing data 771 in graph database 203, so as to supplement pre-existing data 771, based on received user feedback 708 and requests based on interpretation 753. According to such examples, GPT model for data augmentation 704 applies at least the following operations:

User Request for Data Augmentation: The user specifies the need for data augmentation through natural language input, which GPT model for data augmentation 704 interprets to determine the context of the request to generate request based on interpretation 753 which is submitted to graph database 203.

Configured GPT Model for Data Augmentation: Computing device 100 configured as a GPT system for data cleansing and augmentation works with GPT model for data augmentation 704 to identify relevant external data sources 706 that can be added to pre-existing data 771 in graph database 203. GPT model for data augmentation 704 leverages a priori understanding (e.g., schema mappings) of the context and relationships within user data or within company data to make intelligent recommendations for data augmentation.

Data Retrieval: GPT model for data augmentation 704 accesses and retrieves the identified relevant data from identified external sources 706. GPT model for data augmentation 704 may access externally available APIs, externally available subscription services, directly apply web scraping, or other methods to collect the desired data.

Data Preparation and Cleansing: The retrieved external data 772 is passed through computing device 100 specially configured as a GPT system for data cleansing to ensure it is clean, standardized, and compatible with graph database 203. The data is processed and prepared for integration with the pre-existing data 771 in graph database 203.

Schema Mapping and Integration: GPT model for data augmentation 704 collaborates with a graph database 203 and schema recommendation GPT model 604 (see FIG. 6) to map external data 772 to the existing graph schema (e.g., previously refined graph schema 605 at FIG. 6), ensuring seamless integration with the current data structure for pre-existing data 771. This process may involve creating new nodes, relationships, or properties, as well as updating existing ones.

Data Loading and Merging: The cleaned and prepared external data 772 is loaded into graph database 203 using ETL processes 202 (see FIG. 2), where external data 772 is merged with pre-existing data 771. GPT model for data augmentation 704 ensures that the integration is performed efficiently and accurately, maintaining the integrity of pre-existing data 771 while also enhancing pre-existing data 771 with the new data 754 derived from external data 772.

User Feedback and Iteration: According to certain examples, a user may optionally review the results of the data augmentation and provide user feedback 708, which GPT system 200 uses to refine and improve the process. GPT model for data augmentation 704 may therefore iterate and learn from user feedback 708, continuously enhancing performance and accuracy of GPT model for data augmentation 704 with identifying relevant external data sources 706 and integrating those identified external data sources 706 into graph database 203.

Referring again to FIG. 2, contextualized GPT model 205 (also referred to as a GPT-x model) represents an example integrated component of GPT system 200 (refer to FIG. 2), which enables GPT system 200 to understand and respond accurately to natural language questions 265 (see FIG. 2), input, and questions from users. According to such examples, the process of contextualizing to fully train contextualized GPT model 205 involves the following operations:

Data Preparation: Condensed data structure for GPT contextualization 252, which includes properties, nodes, and relationships, is used as the basis for training contextualized GPT model 205. This structure is created from graph database 203 and represents the full data architecture of user data, company data, or whatever data source is being imported into GPT system 200.

Model Training: Contextualized GPT model 205 may optionally be fine-tuned using the prepared data structure as well as through the use of additional domain-specific training data, depending on the chosen implementation. This training process enables contextualized GPT model 205 to better determine the nuances and relationships within data 251 specified by a given user or company, which improves the accuracy of contextualized GPT model 205 responses to natural language queries 265.

Model Integration: Once contextualized GPT model 205 is contextualized, it is communicably linked or otherwise interfaced with a customized language model API, which facilitates the conversion of natural language input into graph database 203 queries. The API provides contextualized GPT model 205 context that allows it to understand the full data structure. The API is utilized to interface with contextualized GPT model 205 and the graph DB querying engine 207 to enable seamless interaction between natural language input 267 provided by users, contextualized GPT model 205, and underlying data 251. This setup allows the API to generate requests with queries 257 to graph database 203 effectively based on the user input and the contextual understanding of the data structure.

Machine learning and graph analytics integration 208 component serves as a key aspect of the AI-based natural language data query and visualization system. Machine learning and graph analytics integration 208 not only facilitates the automated training and deployment of machine learning models but also leverages the powerful analytics capabilities inherent to graph databases 203. According to such an example, the integration process includes the following elements:

Automated AI Model Training and Deployment: AI model training and deployment 271 enables the automated training and deployment of various machine learning models, such as regression, classification, and clustering algorithms. By leveraging rich data structure and contextual relationships of graph database 203, AI model training and deployment 271 produces accurate and valuable predictions based on the user or company data 251.

Graph Database Analytics: The integration of graph analytics capabilities, such as Page Rank, clustering, anomaly detection, and other graph-based algorithms, provides enhanced insights into the data stored in graph database 203. These analytics methods can uncover hidden patterns, trends, and relationships in the data, allowing for more informed decision-making.

Customized Model Selection: GPT system 200 dynamically selects the most appropriate machine learning model or graph analytics algorithm based on the user's input and the specific requirements of the data analysis task at hand. This ensures that GPT system 200 provides optimal insights and recommendations tailored to the user's unique needs and goals.

Model Performance Evaluation: GPT system 200 iteratively or continuously monitors the performance of the deployed machine learning models and graph analytics algorithms to ensure their accuracy and effectiveness. This process may involve the use of various evaluation metrics, such as precision, recall, or F1 score, to assess the quality of the insights generated by the models and algorithms. An F1 score is a machine learning evaluation metric that measures the accuracy of the trained model. The F1 score combines the precision and recall scores of a model. The accuracy metric computes how many times a model made a correct prediction across the entire dataset.

Model Retraining and Iteration: Machine learning and graph analytics integration 208 component supports ongoing retraining and iteration of the models and algorithms to accommodate changes in the data or to improve performance. This process ensures that GPT system 200 remains up-to-date and adaptable to evolving business needs.

By incorporating both machine learning and graph analytics capabilities, machine learning and graph analytics integration 208 component effectively enhances the overall functionality and value of the AI-based natural language data query and visualization system.

Utilizing AI-based natural language data query and visualization capabilities of GPT system 200, users can effortlessly request prescriptive insights using natural language queries 265. This feature enables users to not only obtain data visualizations but also benefit from machine learning and graph analytics capabilities of GPT system 200 to generate valuable recommendations and insights.

When a user submits a natural language request question 265 for prescriptive insight, contextualized 205 GPT model/ GPT-x model processes the input and determines user intent. GPT system 200 then generates the necessary requests with queries 257 to extract relevant data from graph database 203 and selects the appropriate machine learning model or graph analytics algorithm based on user input 267 and the specific requirements of the data analysis task.

According to certain examples, machine learning models and/or graph algorithms are not required, as they are only relevant when such techniques meet the intent and training requirements of the user and the chosen implementation. For instance, user intent signaled to GPT system 200 may indicate only a data visualization, and thus, rather than selecting a specific machine learning model, an appropriate data visualization type model is selected which meets the intent of the user and the data available.

Once the model or algorithm has been selected, GPT system 200 processes the data and runs the chosen model or algorithm to derive prescriptive insights. These insights can include predictions, recommendations, or identification of patterns and trends that may not be apparent through traditional data visualizations.

Upon obtaining the prescriptive insights, GPT system 200 leverages dashboard 204 with visualizations component to create a user-friendly visual representation of the results. This visualization is then presented as output 264 from frontend platform 206, where the user can interact with the generated insights to gain a deeper understanding of the data and make informed decisions.

By seamlessly integrating natural language processing, machine learning, and graph analytics capabilities, the AI-based natural language data query and visualization capabilities of GPT system 200 enables users to effortlessly request and obtain prescriptive insights that can significantly enhance their decision-making processes.

Integration and Interoperability of System Components:

The AI-based natural language data query and visualization capabilities of GPT system 200 enable seamless integration and interoperability of various components of GPT system 200 to ensure a smooth and efficient user experience. This integration process involves the following operational components:

Component Communication: GPT system 200 ensures efficient communication between its components, such as the ETL processes 202, graph database 203, contextualized GPT model 205/GPT-x model, a customized language processing model, machine learning & graph analytics component, data cleansing component, and visualization component. This is achieved through well-defined interfaces and data exchange protocols, facilitating seamless interaction between the components.

Unified Data Format: GPT system 200 employs a unified data format across all components, enabling smooth data flow and processing throughout GPT system 200. This standardization ensures consistency and compatibility when transferring data between components.

Modular Design: GPT system 200 is designed with modularity in mind, allowing for easy updates, upgrades, and enhancements of individual components without impacting the overall functionality of GPT system 200. This modular design also enables GPT system 200 to be scalable and adaptable to evolving data needs and technological advancements.

User Interface Integration: The user interface provided via front end platform 206 and includes the customizable web dashboard 204 and natural language input 267 capabilities, may be fully integrated with underlying components of GPT system 200, providing users with a seamless and intuitive experience for querying, analyzing, and visualizing their data. The user interface is built to facilitate easy access to various features and functions of GPT system 200, streamlining the data analysis process and promoting efficient decision-making.

Security and Access Control: GPT system 200 incorporates robust security features and access control mechanisms via security and access module 211 to ensure the protection of sensitive data and maintain user privacy. These measures may include data encryption, user authentication, and role-based access control, providing a secure environment for data processing and analysis.

API Integration: The customized language processing module is made available as an API and is integrated with the context-aware contextualized GPT model 205/GPT-x model and graph database query engine 207, enabling seamless conversion of natural language input into Cypher queries and facilitating efficient querying and retrieval of data from graph database 203.

By prioritizing the integration and interoperability of its various components, the AI-based natural language data query and visualization system delivers a cohesive, efficient, and user-friendly solution for data management, analysis, and visualization. The streamlined design and seamless communication between components ensure that users can effortlessly leverage advanced features and capabilities of GPT system 200 to gain valuable insights and make informed decisions in a wide range of industries and applications. The comprehensive and integrated approach sets GPT system 200 apart from other data query and visualization tools, positioning it as a groundbreaking and transformative force in the realm of data analysis.

Feedback Loop Mechanism for Enhanced Reliability and Accuracy: In order to improve the reliability and accuracy of GPT system 200, a feedback loop with errors 261 is established between contextualized GPT model 205/GPT-x model and graph database query engine 207 which enables reinforcement learning. This feedback loop ensures that any errors or issues encountered during the query execution process are addressed in a timely and efficient manner.

When graph database querying engine 207 encounters an error or a failed query, the error information is passed back to contextualized GPT model 205/GPT-x model. Contextualized GPT model 205//GPT-x model, which is specifically designed to handle error feedback, processes this information and uses it to refine its understanding of the user's intent and the underlying data structure. With this enhanced understanding, contextualized GPT model 205/GPT-x model generates a modified query that aims to resolve the encountered error.

The modified query is then passed back to graph database querying engine 207 for execution. This iterative process continues until a successful query execution is achieved or a predefined number of attempts have been made. By continuously refining the query based on error feedback, GPT system 200 increases its reliability and accuracy, ensuring that users receive the most relevant and accurate results possible.

This reinforcement learning feedback loop with errors 261 mechanism not only enhances the overall user experience but also contributes to the continuous improvement of understanding by contextualized GPT model 205/GPT-x model of complex data structures and user intent. As a result, GPT system 200 becomes more efficient and effective over time, adapting to the specific needs and requirements of the users and the diverse data structures they interact with. This dynamic learning process further differentiates the present disclosure from existing solutions in the market and adds significant value to the user experience.

Further still, the reinforcement learning feedback loop mechanism is extendable to incorporate user input, enabling users to provide direct feedback regarding performance of GPT system 200, query results (e.g., queried data 258), and any encountered issues. This user feedback may optionally be integrated into learning processes of contextualized GPT model 205/GPT-x model, further enhancing ability of contextualized GPT model 205/GPT-x model to determine user intent, preferences, and the intricacies of the underlying data structures.

By incorporating a robust and adaptive feedback loop with errors 261 mechanism, GPT system 200 adheres to a commitment of continuous improvement and to providing a highly reliable and accurate solution for querying, analyzing, and visualizing complex, interconnected data structures using natural language processing, graph databases, and advanced machine learning techniques.

Customizable Web Dashboard and Collaboration Features: The AI-based natural language data query and visualization capabilities of GPT system 200 places a strong emphasis on user experience and collaboration. The customizable web dashboard 204 and collaboration features are designed to enable users to easily create, modify, and share reports and dashboards 204, fostering efficient teamwork and communication. According to the various examples, such features include:

Drag-and-Drop Functionality: The web dashboard 204 allows users to create and modify reports and dashboards with an intuitive drag-and-drop interface. Users can easily add, remove, or rearrange visualization components to create customized views of their data 251.

Visualization Customization: GPT system 200 offers a wide range of visualization options, including various graph representations, charts, and maps, allowing users to tailor their visualizations to best represent their data and convey the desired insights.

Dashboard Templates: GPT system 200 provides pre-built dashboard templates for various industries and applications, enabling users to quickly create tailored dashboards based on their specific needs and preferences.

Real-Time Collaboration: The web dashboard 204 supports real-time collaboration, allowing multiple users to work on a shared dashboard 204 simultaneously. This feature enhances teamwork and enables efficient communication of insights and ideas within teams and organizations.

Report and Dashboard Sharing: Users can easily share their reports and dashboards with colleagues or external stakeholders through various formats, such as producible PDFs, sharable web links, or pure JSON structures. This sharing capability promotes collaboration and ensures that the relevant parties have access to the latest data insights.

Access Control and Permissions: GPT system 200 incorporates role-based access control and permissions, allowing administrators to manage user access to specific reports, dashboards, and data sources. This feature ensures that sensitive information is protected and only accessible to authorized users.

By incorporating these customizable web dashboard 204 and collaboration features, the AI-based natural language data query and visualization capabilities of GPT system 200 enhances the user experience and promotes efficient teamwork and communication within teams and organizations. These features, in combination with advanced technical components of GPT system 200, provide a comprehensive and user-friendly solution for data management, analysis, and visualization across a wide range of industries and applications.

Overview of the AI-based natural language data query and visualization system: GPT system 200 as described herein has the potential to revolutionize data-driven decision-making and transform the way users interact with and analyze data across various sectors. The combination of cutting-edge technologies, seamless integration, and user-friendly interface and collaboration features positions GPT system 200 as a groundbreaking and comprehensive solution to the challenges faced by traditional data query and visualization tools.

System scalability and extensibility with a graph database: The AI-based natural language data query and visualization capabilities of GPT system 200, built upon a graph database, is designed with scalability and extensibility in mind, ensuring that it can adapt to increasing data volumes, evolving user needs, and advancements in technology. According to such examples, the use of a graph database 203 provides at least the following features:

Scalable Architecture: Graph database 203 at the core of GPT system 200 is inherently scalable, allowing for efficient handling of increasing data volumes and user demands. Graph databases excel at managing complex relationships and interconnected data, ensuring that GPT system 200 can scale horizontally or vertically to accommodate growing data needs without compromising performance.

Flexible Data Source Integration: Graph databases can easily integrate with a wide variety of data sources, including relational databases, NoSQL databases, APIs, and flat files. This flexibility ensures that users can continually expand their data sources while preserving the interconnected nature of their data, providing a unified view for analysis.

Evolving Query Capabilities: As graph database 203 evolves and new querying capabilities become available, GPT system 200 can be easily updated to incorporate these advancements. This ensures that GPT system 200 remains at the forefront of technological developments in data querying and continues to deliver accurate and insightful data analysis and visualization.

Enhanced Performance: Graph databases are designed to provide efficient traversal and querying of complex relationships, even as the data volume grows. This ensures that GPT system 200 maintains high performance levels and quick response times, regardless of the scale of the data being analyzed.

Extensible Visualization and Analysis: GPT system 200 can be easily extended to incorporate new visualization techniques and analysis methods that complement graph database 203 structure. This allows users to continually expand their data exploration capabilities and gain deeper insights into their data.

Integration with Advanced Technologies: Graph database 203 based system seamlessly integrates with advanced technologies such as machine learning, natural language processing, and data cleansing components. This ensures that GPT system 200 evolves along with the latest advancements and maintains its cutting-edge capabilities in data analysis and visualization.

By leveraging a graph database 203, the AI-based natural language data query and visualization system is well-equipped to handle scalability and extensibility challenges, providing a robust and adaptable solution for data management, analysis, and visualization across various industries and applications. The combination of graph database technology with other advanced components ensures that GPT system 200 remains innovative and effective in delivering valuable insights and driving data-driven decision-making.

Graph Database and GPT Model Synergy: The inherent structure of graph databases, which naturally represents data as entities (nodes) and relationships (edges), creates a highly conducive environment for the integration of contextualized GPT models 205. This synergy between graph databases 203 and contextualized GPT models 205 plays a critical role in the overall disclosure and represents a breakthrough in the field of data management and analysis.

Intuitive Representation of Relationships: Graph databases 203 are optimized for storing and managing complex relationships between data entities. This intuitive representation aligns well with the natural language understanding capabilities of contextualized GPT models 205. Contextualized GPT model 205 leverages graph database 203 structure to better comprehend and process user queries in natural language, which often involve implicit relationships between data entities.

Scalability and Flexibility: Graph databases 203 are highly scalable and flexible, allowing for efficient storage and querying of large volumes of interconnected data. This scalability is essential for the integration of contextualized GPT models 205, which typically require substantial amounts of data for training and contextualization. The flexibility of graph databases also enables seamless adaptation to changing data structures, ensuring that contextualized GPT model 205 remains accurate and up-to-date as the underlying data evolves.

Efficient Querying and Pattern Matching: Graph databases 203 are designed for efficient querying and pattern matching, making it easier for the GPT model to generate meaningful queries based on natural language input. Query language for graph database 203, such as Cypher, is inherently expressive and well-suited for translating natural language queries into structured queries that can be executed on graph database 203. This efficiency in querying and pattern matching allows contextualized GPT model 205 to provide more accurate and relevant results to the user.

Knowledge Graph Integration: The combination of graph database 203 and contextualized GPT model 205 creates a powerful knowledge graph that can store, manage, and analyze vast amounts of interconnected data. This knowledge graph enables contextualized GPT model 205 to draw upon a wealth of contextual information when processing user queries, leading to more accurate and insightful results. The integration of a knowledge graph also supports advanced data analysis capabilities, such as semantic search and reasoning, which can further enhance the user experience.

Enhanced Data Exploration and Discovery: The synergy between graph databases 203 and contextualized GPT models 205 facilitates more intuitive and efficient data exploration and discovery. Users can interact with GPT system 200 using natural language, allowing them to ask complex questions and explore relationships between data entities without the need for specialized technical knowledge. This user-friendly interface encourages users to delve deeper into their data, uncovering valuable insights and driving better decision-making.

Consequently, GPT system 200 provides the synergy between graph databases and contextualized GPT models 205, enabling a powerful and intuitive AI-driven data management and analysis system. This breakthrough in the field allows users to efficiently query, visualize, and analyze data using natural language, revolutionizing the way they interact with and gain insights from their data.

Security and Access Management: The graph-based natural language processing system includes various components that ensure security, access control, and data integrity, according to the described examples, set forth as follows:

Authentication component: The frontend platform 206 incorporates an authentication component that verifies the user's identity before granting access to GPT system 200. This component supports multiple authentication methods, such as username/password combinations or OAuth. In GPT system 200 diagram, a sub-module within the frontend platform 206 provides authentication and is connected to a user interface component.

Authorization component: The frontend platform 206 also contains an authorization component that manages user access based on roles and permissions. This component allows administrators to define and assign roles and permissions, ensuring that users can only access the data they are authorized to view. In GPT system 200 diagram, a sub-module within the frontend platform 206 provides authentication and is connected to a user interface component and graph database 203.

Backup and recovery: Graph database 203 may be equipped with a backup and recovery component to ensure data security and recoverability in case of system failure. This component regularly backs up the data and allows for easy recovery if needed. In GPT system 200 diagram, a sub-module within graph database 203 may be provided as a backup and recovery module.

Audit and logging: Frontend platform 206 may include an audit and logging component that tracks and records user activity within GPT system 200. This component maintains a log of user actions and can be accessed and analyzed by administrators to monitor usage and detect potential security issues. In GPT system 200 diagram, a sub-module within the frontend platform may be provided as an audit and logging module and may be connected to a user interface component and graph database 203.

Figure 8:
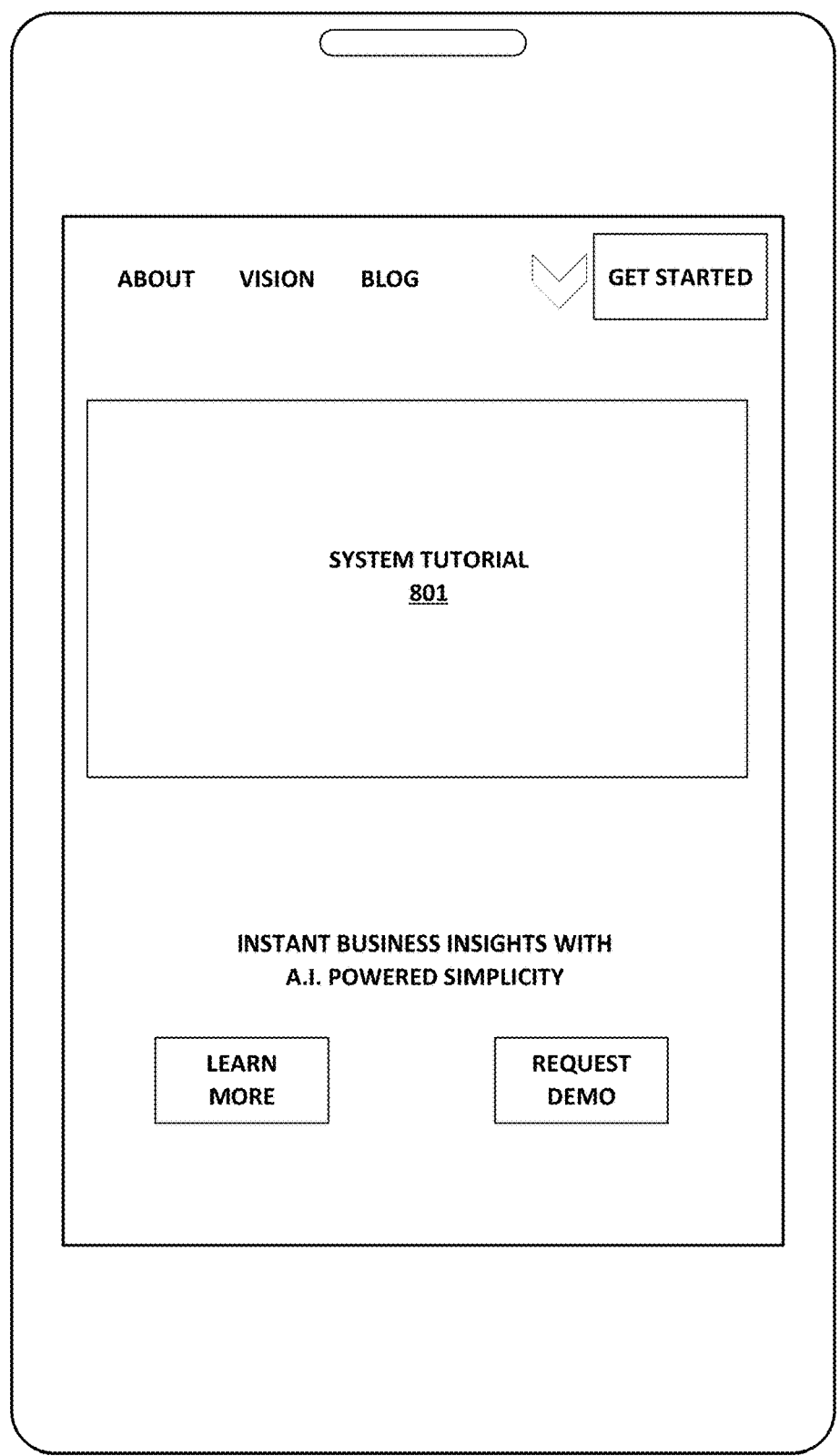
FIG. 8 depicts an example product demonstration and subscription interface 800 via which GPT system 200 may be accessed as a cloud-based service, in accordance with aspects of the disclosure.

FIG. 8 depicts an example product demonstration and subscription interface 800 via which GPT system 200 may be accessed as a cloud based service, in accordance with aspects of the disclosure.

Product demonstration and subscription interface 800 may be provided as a SaaS product (e.g., a Software as a Service product) or as a cloud based subscription to users. Depicted here is a landing page presenting a system tutorial 701 for GPT system 200 providing instant business insights with ai powered simplicity. Visitors to the page can click on request demo to initiate a demonstration of the SaaS product, click learn more to learn additional details about the SaaS product, or click get started to initiate a subscription.

Figure 9:
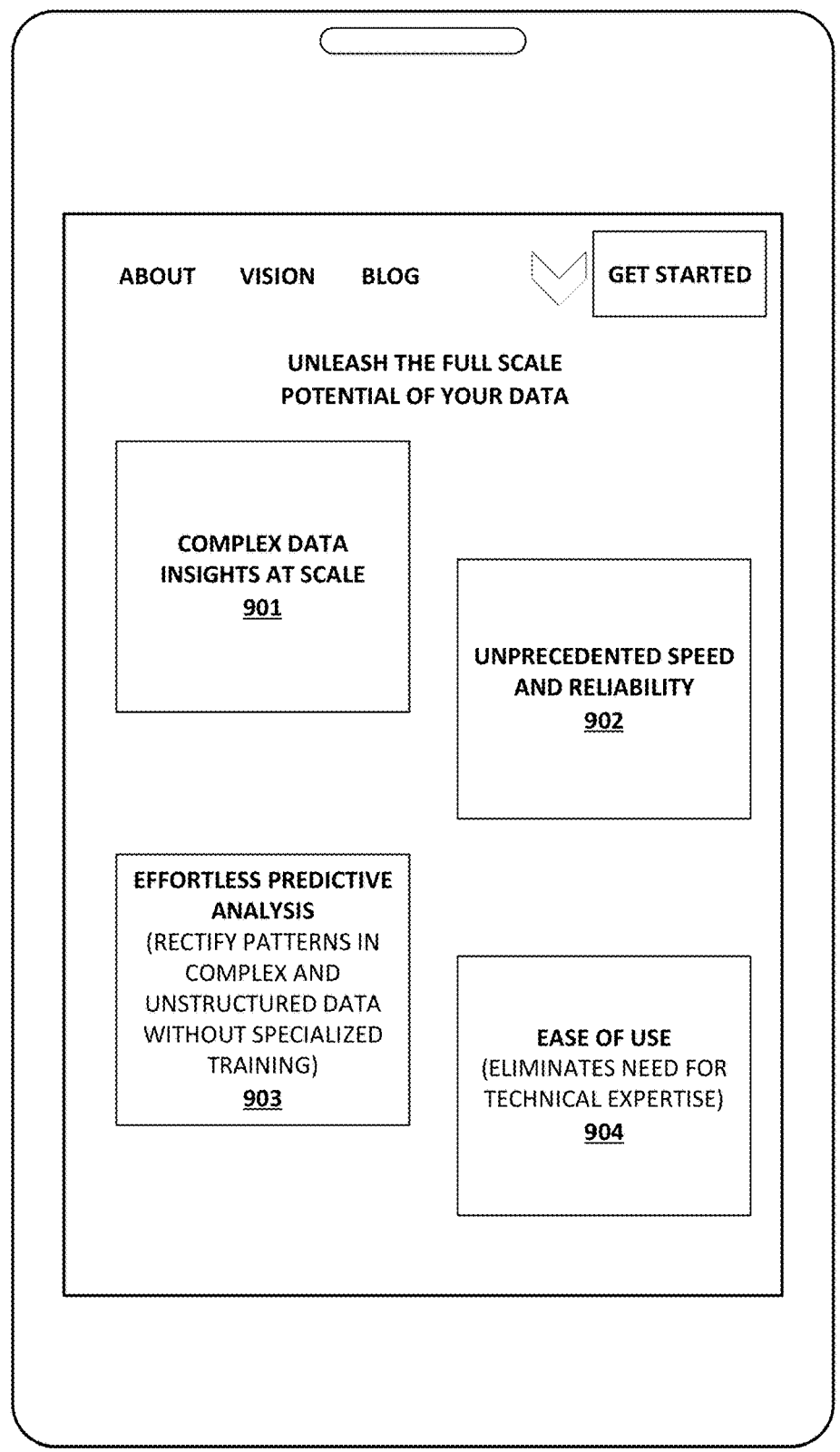
FIG. 9 depicts an exemplary SaaS product features interface with a product features page 950 listing specific features, in accordance with aspects of the disclosure.

FIG. 9 depicts an exemplary SaaS product features interface with a product features page 950 listing specific features, in accordance with aspects of the disclosure. Product features page 950 details the various functionalities of an exemplary SaaS product, such as functionality accessible via a cloud based service.

In particular, there is shown the features page providing features including complex data insights at scale 901, unprecedented speed and reliability 902, effortless predictive analysis 903, for instance, to rectify patterns in complex and unstructured data without the need of specialized training as shown by element, and ease of use 904 which eliminates the need of technical expertise.

Figure 10:
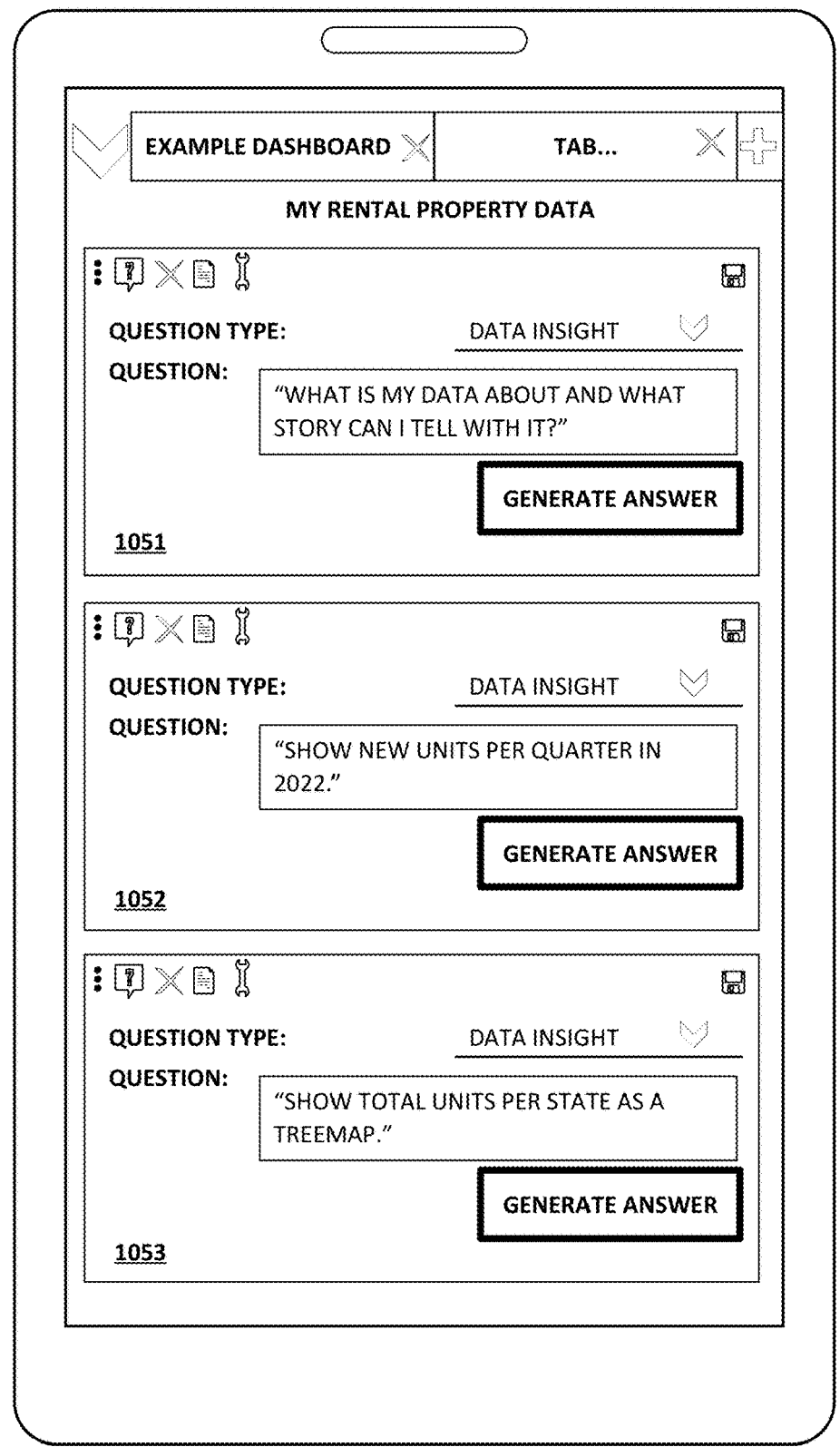
FIG. 10 depicts an exemplary SaaS product use case showing end-user questions, in which an example user questions interface 1000 which facilitates receipt of user questions as input to form the basis of queries into GPT system 200, in accordance with aspects of the disclosure.

FIG. 10 depicts an exemplary SaaS product use case showing end-user questions, in which an example user questions interface 1000 which facilitates receipt of user questions as input to form the basis of queries into GPT system 200, in accordance with aspects of the disclosure.

In particular, there is a web page utility GUI (graphical user interface or UI) having a data insights block via which the user may submit as input their natural human language inquiries at the upper left and a data visualization generation and results section on the right hand side. User questions input into GTP system front end 1050 depicts multiple sub-interfaces via which a user may select a type of question (e.g., such as a data insight) and then ask a question to GPT system 200 using natural language. The user may then press the "submit" button to transmit the input at the GUI from the user device to the GPT system 200 for processing.

As shown here, three different questions are being asked. In the top sub-interface 1051 a user asks: "What is my data about and what story can I tell with it?" In the middle sub-interface 1052 a user requests "Show new units per quarter in 2022." In the bottom sub-interface 1053 a user requests "Show total units per state as a treemap."

Figure 11:
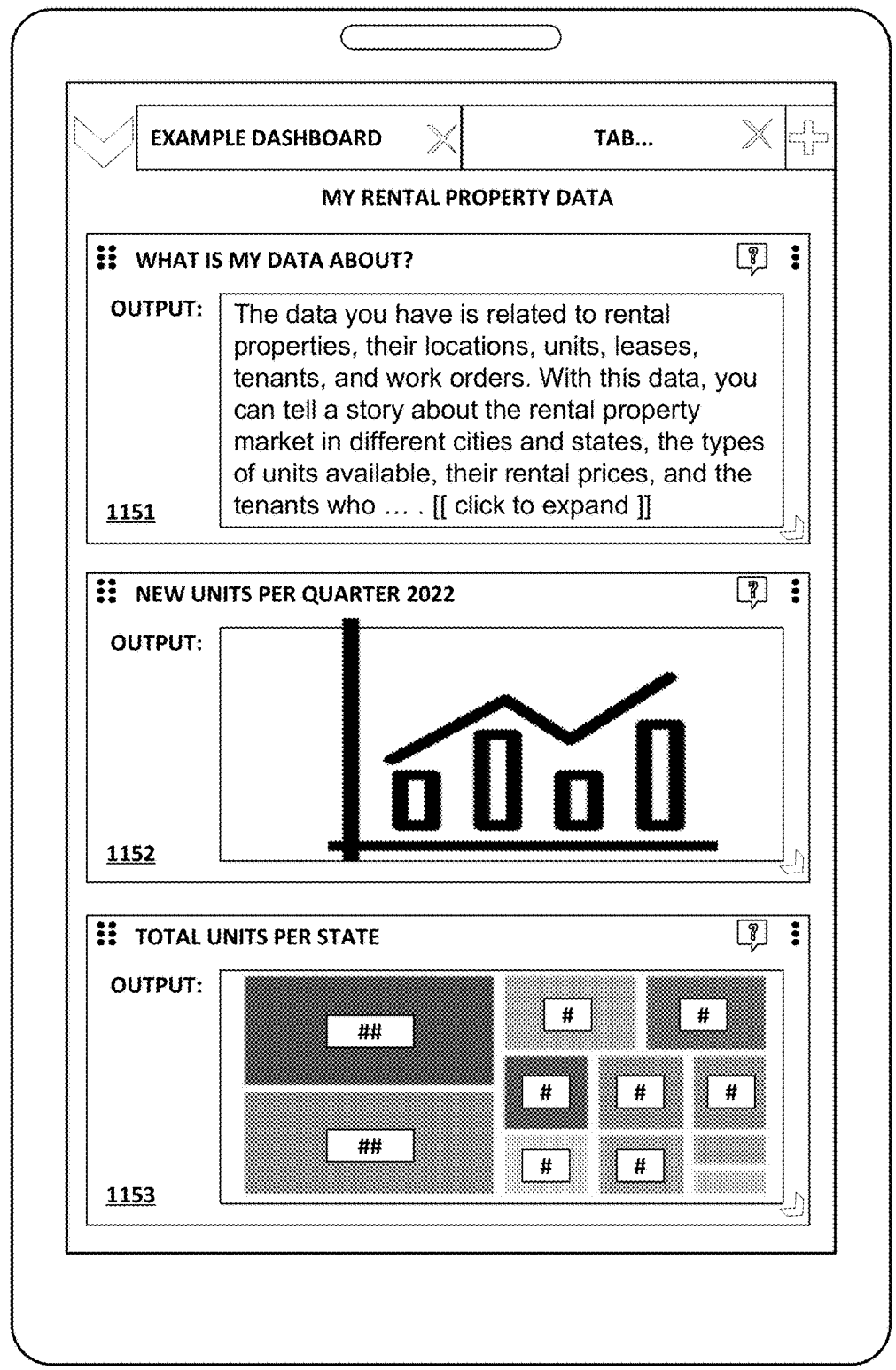
FIG. 11 depicts an example visualization interface 1100 as system output showing visualizations produced by GPT system 200 responsive to the user questions provided as input, according to aspects of the disclosure.

FIG. 11 depicts an example visualization interface 1100 as system output showing visualizations produced by GPT system 200 responsive to the user questions provided as input, according to aspects of the disclosure. For instance, visualization interface 1100 outputs insights generated by GPT system 200 in response to the user questions.

In particular, there is another web page utility GUI providing more detailed visualization produced by GPT system 200 responsive to the user questions and requests described in the context of FIG. 10. For instance, shown here are various rental property data with visualizations generated by GPT system 200. The top sub-interface 1151 has summarized the question from sub-interface 1051 as "What is my data about?" The top sub-interface 1151 thus provides a GPT system 200 generated narrative summarizing the data, for instance, describing the data as being "related to rental properties, their locations, units, leases, tenants," and so forth. The middle sub-interface 1152 has summarized the request from sub-interface 1052 as "New units per quarter 2022." The middle sub-interface 1152 thus provides a GPT system 200 generated visualization graphically summarizing the data, for instance, depicting a bar graph derived from the user's data. The bottom sub-interface 1153 has summarized the request from sub-interface 1053 as "Total units per state." Although nothing is stated in the label, the bottom sub-interface 1153 provides a GPT system 200 generated visualization in the form of a treemap graphically summarizing the data requested.

When used in combination, such components provide a comprehensive solution for the security and access management features of the graph-based natural language processing system.

Case Studies and Industry Applications: The AI-based natural language data query and visualization system is versatile and can be applied across various industries and applications. Examples include:

A proof of concept test and evaluation for business-to-business (B2B) Software as a Service (SaaS) product, such as that which is depicted at FIGS. 8-11, serves as an exemplary use case of the graph-based natural language processing system described in the present disclosure. The platform enables users across various industries to efficiently analyze and visualize complex data structures through an intuitive, user-friendly interface.

Another proof of concept test and evaluation for healthcare may be utilized in the healthcare industry to analyze patient data, medical records, and treatment outcomes. For instance, medical professionals can use natural language queries to easily access relevant information, identify patterns and trends, and make informed decisions regarding patient care.

Another proof of concept test and evaluation for financial services may be employed to analyze complex financial data, such as stock market trends, company performance, and economic indicators. Financial analysts can utilize natural language queries to efficiently retrieve data, visualize patterns, and gain insights for investment strategies and risk assessment.

Another proof of concept test and evaluation for scientific research may be used in scientific research settings to analyze experimental data, literature, and findings from various studies. Researchers can use natural language queries to explore connections between data points, identify trends, and generate hypotheses for further investigation.

Another proof of concept test and evaluation for supply chain management may be employed to analyze and visualize data related to inventory levels, supplier performance, and customer demand. Using natural language queries, supply chain managers can quickly access relevant information, identify inefficiencies, and make informed decisions to optimize processes.

Another proof of concept test and evaluation for marketing and sales may be utilized in marketing and sales applications to analyze customer data, market trends, and sales performance. Marketing and sales professionals can use natural language queries to easily access consumer insights, identify patterns, and develop targeted strategies to improve customer acquisition and retention.

Another proof of concept test and evaluation for human resources to analyze employee data, performance metrics, and workforce trends. HR professionals can use natural language queries to efficiently access relevant information, identify patterns, and make data-driven decisions to enhance employee engagement, retention, and productivity.

Another proof of concept test and evaluation for the manufacturing industry to analyze production data, equipment performance, and quality metrics. Manufacturing managers can use natural language queries to quickly access critical information, detect inefficiencies, and make informed decisions to optimize production processes and maintain high-quality standards.

In such a way, the AI-based natural language data query and visualization system is a groundbreaking solution that integrates advanced technologies such as graph databases, a system of contextualized and configured GPT-x models, an API layer that leverages customized language processing model, and state-of-the-art visualization components to address the limitations of traditional data query and visualization tools. This patent filing effectively communicates the disclosure's unique value, novelty, and non-obviousness by providing detailed technical information, emphasizing GPT system 200's innovative features, and showcasing its wide range of applications across various industries.

Designed with scalability and adaptability in mind, GPT system 200 can evolve with emerging technological advancements in artificial intelligence, natural language processing, and data visualization. Its ability to learn from user interactions and adapt to specific needs sets it apart from other data management tools, further enhancing its value and utility.

The user-friendly customizable web dashboard, along with its focus on user experience and collaboration, makes GPT system 200 accessible to users with varying technical expertise, ultimately democratizing data analysis and enabling more individuals to benefit from data-driven insights.

Overall, the AI-based natural language data query and visualization system presents a comprehensive and transformative solution for data management, analysis, and visualization. Its versatility, scalability, and adaptability make it a powerful tool across a wide range of industries and applications, poised to revolutionize data-driven decision-making and transform the way we analyze and interact with data. The detailed technical information, emphasis on novelty, and specific language in this patent filing effectively demonstrate the unique value and benefits of the disclosure, positioning it as a compelling and innovative tool in the realm of data management and analysis.

By addressing the challenges faced by traditional data query and visualization tools, the AI-based natural language data query and visualization system sets a new standard for data exploration and insight generation. With its focus on seamless integration, advanced technologies, and user experience, GPT system 200 offers significant potential to drive innovation and impact across a wide array of industries and applications, ultimately contributing to the advancement of data-driven decision-making processes and the optimization of data analysis for a more informed and connected world.

The SaaS product, as shown in FIGS. 8-11 depicts a B2B platform that implements various aspects of the present disclosure, offering a powerful and versatile solution for data management, analysis, and visualization. The following features and functionalities are provided by GPT system 200, in accordance with aspects of the disclosure.

Natural Language Processing (NLP): The platform incorporates advanced NLP capabilities, allowing users to interact with GPT system 200 using natural language queries. This feature simplifies the process of data exploration and analysis, enabling users with limited technical expertise to access valuable insights. The NLP module employs a contextualized GPT-x model to understand and process user queries, converting them into Cypher queries that can be executed against graph database 203.

Graph-based Data Structures: The platform utilizes a graph database to store and manage data, enabling efficient querying and analysis of complex, interconnected data structures. Graph database 203 schema, designed to store entities and relationships, allows users to explore and visualize data from multiple perspectives and dimensions, uncovering hidden patterns and insights.

Machine Learning Integration: The platform integrates machine learning models and algorithms, such as recommendation systems, predictive analytics, and anomaly detection, to provide users with actionable insights and data-driven decision-making capabilities. The platform supports transfer learning, allowing users to leverage pre-trained models and adapt them to their specific data and use cases.

Data Pipeline Automation: The platform supports the creation and management of automated data pipelines, streamlining the process of data ingestion, transformation, and loading (ETL). This feature ensures consistent and up-to-date data availability, enabling users to focus on data analysis and visualization tasks.

Customizable Visualizations: The platform offers a wide range of data visualization formats and interactivity options, allowing users to create custom visualizations tailored to their specific needs and preferences. Users can easily explore and analyze their data through interactive charts, graphs, and maps.

Scalability and Deployment Flexibility: The platform is designed to be scalable and adaptable, supporting various deployment options such as on-premises, private cloud, public cloud, and hybrid environments. This flexibility allows organizations to choose the most suitable infrastructure for their specific needs and constraints.

Security and Compliance: The platform incorporates state-of-the-art security mechanisms, including encryption, access control, and monitoring, to protect the confidentiality, integrity, and availability of the data stored in GPT system 200.

Unique challenges overcome and solved through the use of the exemplary SaaS product include the integration of NLP capabilities with graph-based data structures, the development of a scalable and flexible system architecture, and the implementation of advanced data processing and machine learning features. By overcoming these challenges, the platform provides a comprehensive and user-friendly solution that empowers users to harness the power of natural language processing, graph-based data structures, and machine learning technologies to effectively manage, analyze, and visualize their data.

Figure 12:
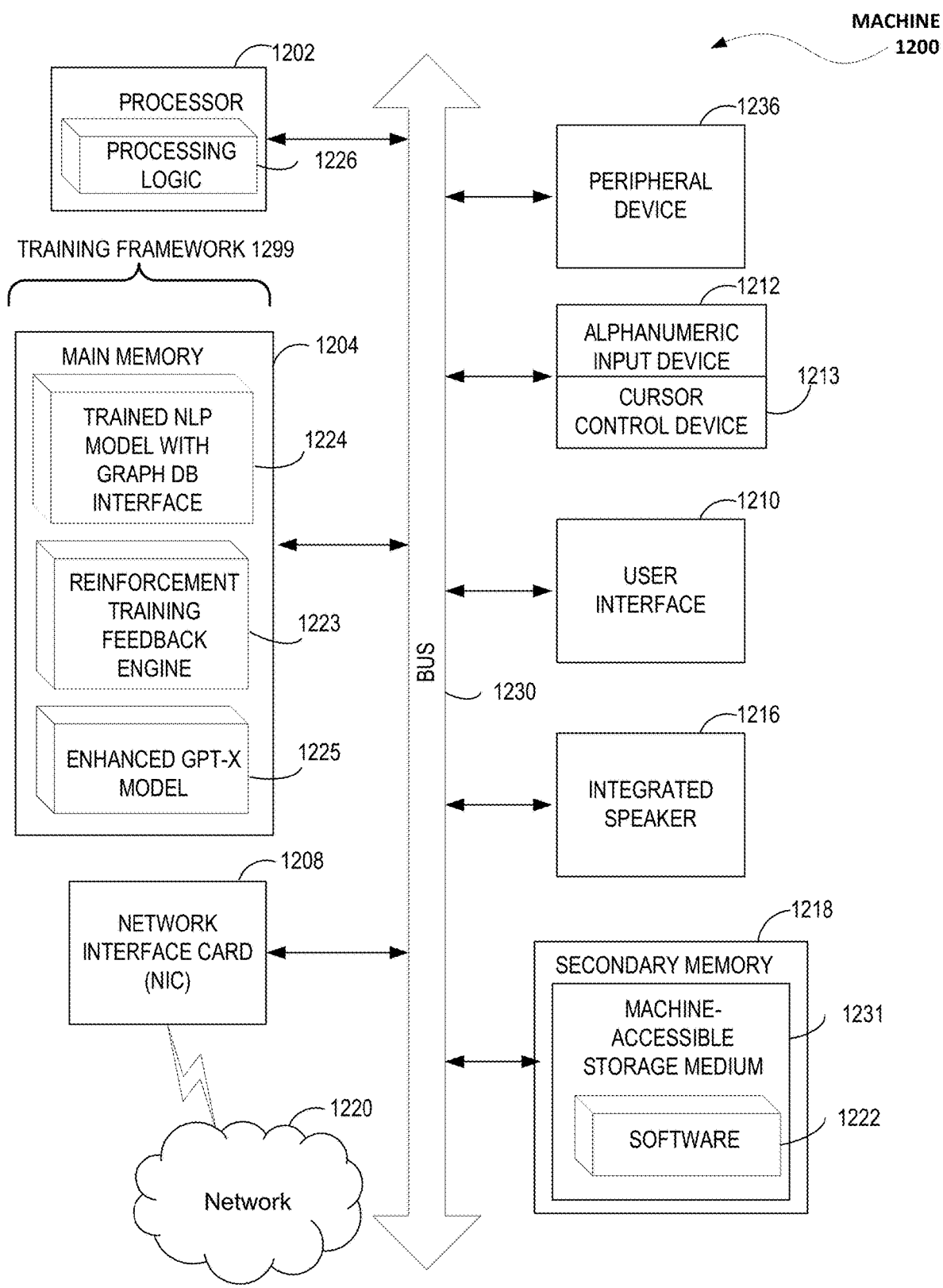
FIG. 12 illustrates a diagrammatic representation of a machine 1200 in the exemplary form of a computer system, in accordance with aspects of the disclosure, within which a set of instructions, for causing the machine/computer system to perform any one or more of the methodologies discussed herein, may be executed.

FIG. 12 illustrates a diagrammatic representation of a machine 1200 in the exemplary form of a computer system, in accordance with aspects of the disclosure, within which a set of instructions, for causing the machine/computer system to perform any one or more of the methodologies discussed herein, may be executed.

In alternative examples, machine 1200 may be connected (e.g., networked) to other machines in a Local Area Network (LAN), an intranet, an extranet, or the public Internet. Machine 1200 may operate in the capacity of a server or a client machine in a client-server network environment, as a peer machine in a peer-to-peer (or distributed) network environment, as a server or series of servers within an on-demand service environment. Certain examples of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine 1200 is illustrated, the term "machine" shall also be taken to include any collection of machines (e.g., computers) that individually or jointly execute a set (or multiple sets) of instructions to perform any one or more of the methodologies discussed herein.

Machine 1200 includes processor 1202, main memory 1204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and secondary memory 1218 (e.g., a persistent storage device including hard disk drives and a persistent database and/or a multi-tenant database implementation), which communicate with each other via a bus 1230. Main memory 1204 includes instructions for executing the various components of the graph-based Natural Language Processing GPT system 200 and training framework 1299 as described herein, including trained NLP model with graph DB interface 1224, reinforcement learning feedback engine 1223, and enhanced GPT-x model 1225, in support of the methodologies and techniques described herein. Main memory 1204 and its sub-elements are further operable in conjunction with processing logic 1226 and processor 1202 to perform the methodologies discussed herein.

Processor 1202 represents one or more specialized and specifically configured processing devices such as a microprocessor, central processing unit, or the like. More particularly, processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application-specific integrated circuit (ASIC), a field programmable gate array (FPGA), a digital signal processor (DSP), network processor, or the like. Processor 1202 is configured to execute processing logic 1226 for performing the operations and functionality which is discussed herein.

Machine 1200 may further include a network interface card 1208. Machine 1200 also may include user interface 1210 (such as a video display unit, a liquid crystal display, etc.), an alphanumeric input device 1212 (e.g., a keyboard), a cursor control device 1213 (e.g., a mouse), and a signal generation device 1216 (e.g., an integrated speaker). Machine 1201 or computer system may further include peripheral device 1236 (e.g., wireless or wired communication devices, memory devices, storage devices, audio processing devices, video processing devices, etc.).

Secondary memory 1218 may include a non-transitory machine-readable storage medium or a non-transitory computer readable storage medium or a non-transitory machine-accessible storage medium 1231 on which is stored one or more sets of instructions (e.g., software 1222) embodying any one or more of the methodologies or functions described herein. Software 1222 may also reside, completely or at least partially, within main memory 1204 and/or within processor 1202 during execution thereof by machine 1201, main memory 1204 and processor 1202 also constituting machine-readable storage media. The software 1222 may further be transmitted or received over network 1220 via network interface card 1208.

Figure 13:
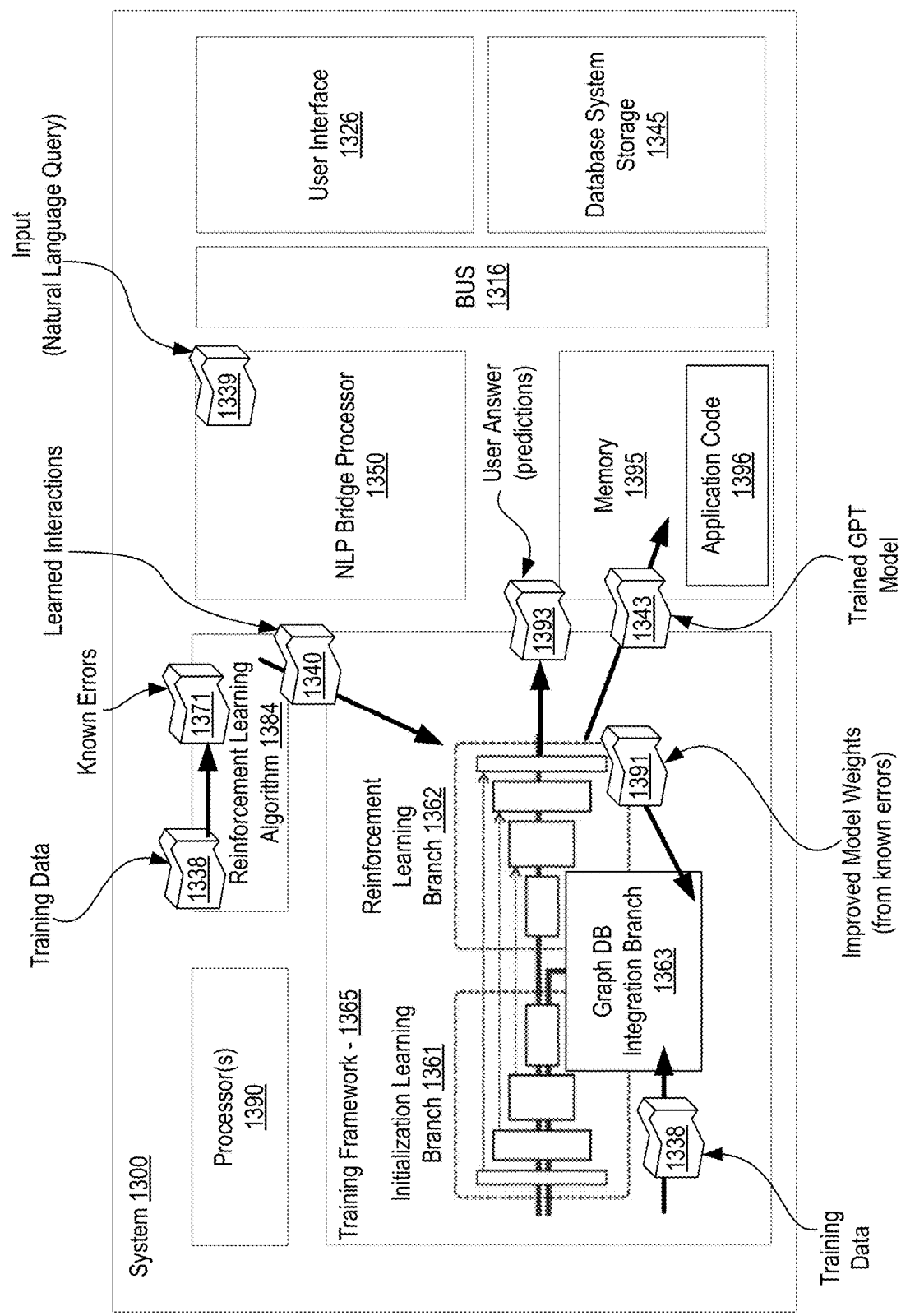
FIG. 13 depicts a diagrammatic representation of a system 1300 within which examples may operate, be installed, integrated, or configured.

FIG. 13 depicts a diagrammatic representation of a system 1300 within which examples may operate, be installed, integrated, or configured. In accordance with one example, system 1300 includes at least processor 1390 and memory 1395 therein to execute implementing application code

1396. System 1300 may communicatively interface with and cooperatively execute with the benefit of remote systems, such as a user device sending instructions and data or natural language queries as input 1339 to system 1300. Similarly, a user device to receive output from system 1300 via user interface 1326 generated via trained GPT model 1343 configured for conducting natural language based queries against unstructured data and complex data structures stored within database system storage 1345 of system 1300 including graph database type systems. Further depicted is training framework 1365 having initializing learning branch 1361 and reinforcement learning branch 1362, each of which are used to consume training data 1338 and improved model weights 1391 from known errors 1371 into graph database integration branch 1363.

According to the depicted example, system 1300, includes processor 1390 and memory 1395 to execute instructions at system 1300. System 1300 as depicted here is specifically customized and configured to systematically generate trained model 1343 which is generated as output and when executed, consumes user input 1339 in natural language form to generate a user answer 1393 (e.g., a prediction or predictive output) as output from system 1300, which may take the form of an ai model prediction.

According to a particular example, there is a specially configured system 1300 which is custom configured to generate trained model 1343 through the combined use of deep learning techniques and improved NLP system processing techniques to integrate NLP system capabilities with graph database query and analysis techniques. According to such an example, system 1300 includes: a memory 1395 to store instructions via executable application code 1396; a processor 1390 to execute the instructions stored in memory 1395; in which system 1300 is specially configured to execute the instructions stored in the memory via the processor which causes the system to receive training data 1338 having at a framework.

Further processing by the system includes the application of reinforcement learning via a feedback loop capable of integrating known errors 1371 into improved model variants via improved model weights 1391.

The system then outputs a pre-trained model 1343 from training framework 1365 based on the training.

According to another example of system 1300, a user interface 1326 communicably interfaces with a user client device remote from the system and communicatively interfaces with the system via a public Internet.

Bus 1316 interfaces the various components of system 1300 amongst each other, with any other peripheral(s) of system 1300, and with external components such as external network elements, other machines, client devices, database system storage 1345, cloud computing services, etc. Communications may further include communicating with external devices via a network interface over a LAN, WAN, or the public Internet.

Figure 14:
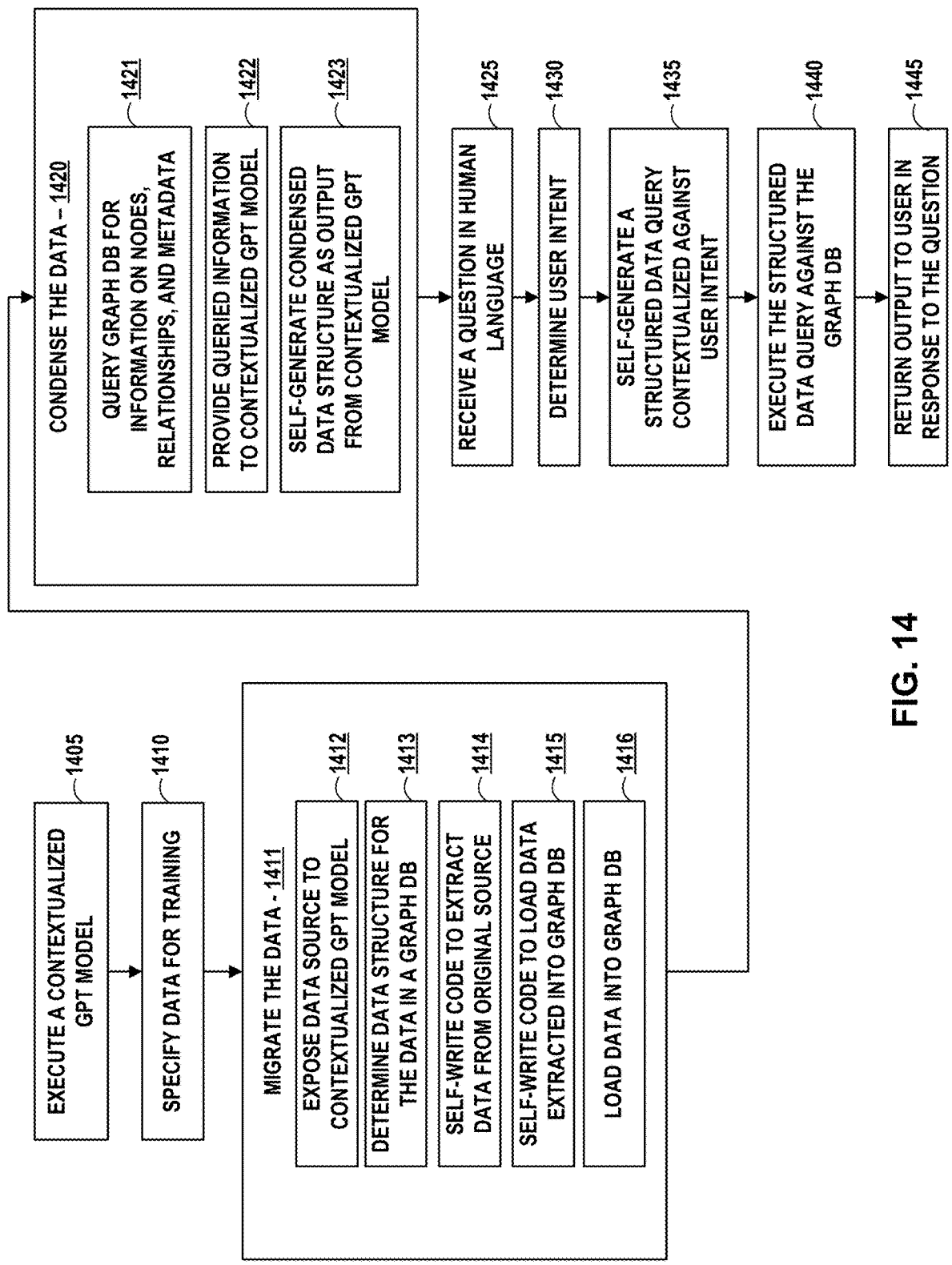
FIG. 14 is a flow chart illustrating an example mode of operation for computing device 100 to implement graph-based Natural Language Processing (NLP) for querying, analyzing, and visualizing complex data structures, in accordance with aspects of the disclosure.

FIG. 14 is a flow chart illustrating an example mode of operation for computing device 100 to implement graph-based Natural Language Processing (NLP) for querying, analyzing, and visualizing complex data structures, in accordance with aspects of the disclosure. The mode of operation is described with respect to computing device 100 and FIGS. 1-13.

Computing device 100 may execute an AI language model (1405). For example, processing circuitry 199 of computing device 100 may execute a contextualized GPT model 205 (e.g., also referred to as an AI language model) capable of interpreting data and a variety of formats and structures.

Computing device 100 may specify data 251 for training (1410). For example, processing circuitry 199 of computing device 100 may specify data 251 for training contextualized GPT model 205 available from one or more original data sources 201.

Computing device 100 may migrate data 251 (1411). For instance, data migration operations (1411) may include exposing data source 201 to contextualized GPT model 205 (1412), determining the data structure for data 251 in graph database 203 (1413), self-writing code to extract data 251 from an original data source 201 (1414), and loading data 251 into the graph database 203 (1416). For example, processing circuitry 199 of computing device 100 may migrate data 251 specified for training contextualized GPT model 205 from one or more original data sources 201 into graph database 203 by exposing one or more original data sources 201 to contextualized GPT model 205. Processing circuitry 199 of computing device 100 may perform data migration operations which include the following: Processing circuitry 199 of computing device 100 may determine, via contextualized GPT model 205, a data structure for graph database 203. Processing circuitry 199 of computing device 100 may generate, via contextualized GPT model 205, an executable query script having self-written code to extract the data from the one or more original data sources exposed to the AI language model. Processing circuitry 199 of computing device 100 may execute the executable query script to extract data 251 from one or more original data sources 201. Processing circuitry 199 of computing device 100 may generate, via the AI language model, an executable load script having self-written code to load data 251 extracted from one or more original data sources 201 into the data structure of graph database 203 as new nodes and new relationships with directionality between the new nodes and having metadata parameters within the new nodes describing data 251 loaded into graph database 203. Processing circuitry 199 of computing device 100 may execute the executable load script to load data 251 extracted from one or more original data sources 201 into the graph database 203.

Computing device 100 may condense data 251 (1420). For instance, data condensing operations may include querying graph database 203 for information on nodes, relationships, and metadata (1421), providing queried information to contextualized GPT model 205 (1422) and self-generating a condensed data structure as output from contextualized GPT model 205 (1423). For example, processing circuitry 199 of computing device 100 may condense the data stored within graph database 203 into a condensed data structure representing a full architecture of data 251 in a natural language format by performing data condensing operations which include the following: Processing circuitry 199 of computing device 100 may query graph database 203 to obtain information on the new nodes, the new relationships, and the metadata parameters within graph database 203. Processing circuitry 199 of computing device 100 may provide as input to contextualized GPT model 205, the information on the new nodes, the new relationships, and the metadata parameters. Processing circuitry 199 of computing device 100 may, responsive to providing as input to contextualized GPT model 205, the information on the new nodes, the new relationships, and the metadata parameters, generate as output from contextualized GPT model 205, the condensed data structure.

Computing device 100 may receive a question in human language (1425). For example, processing circuitry 199 of computing device 100 may receive a question as user-input in natural human language.

Computing device 100 may determine user intent (1430). For example, processing circuitry 199 of computing device 100 may execute contextualized GPT model 205 to determine a user-intent from the user-input.

Computing device 100 may self-generate a structured data query contextualized against user intent (1435). For example, processing circuitry 199 of computing device 100 may execute contextualized GPT model 205 to generate a structured data query contextualized against the condensed data structure based on the determined user-intent.

Computing device 100 may execute the structured data query against the graph database 203 (1440). For example, processing circuitry 199 of computing device 100 may execute the structured data query against the graph database 203.

Computing device 100 may return output to a user in response to the question (1445). For example, processing circuitry 199 of computing device 100 may return output in a structured format to a user-device having originated the user-input.

In some examples, computing device 100 implements a graph-based Natural Language Processing (NLP) system.

In some examples, processing circuitry 199 is further configured to execute a hybrid AI model that combines graph-based functionality and vector-based functionality to increase data querying, data retrieval, and data visualization capabilities of the system.

In some examples, processing circuitry 199 is further configured to append attribute data to the new nodes within the graph database. In some examples, the attribute data includes one or more of: metadata describing the data; context-specific information for the data; first vector embeddings representing semantic meaning of the data; and second vector embeddings representing relation of a first data point within the data to a second one or more data points within the data stored to the graph database.

In some examples, processing circuitry 199 is further configured to utilize the attribute data appended to the new nodes within the graph database to augment data retrieval of the data from the graph database. In some examples, the attribute data appended to the new nodes enables the system to execute queries with increased fidelity that consider both the data structure for the graph database and semantic relationships encapsulated within the first vector embeddings of the attribute data. In some examples, use of the semantic relationships encapsulated within the first vector embeddings of the attribute data enable deeper analysis into the data and more comprehensive exploration of the data than without use of the semantic relationships.

In some examples, processing circuitry 199 is further configured to apply an enhanced Retrieval-Augmented Generation (RAG) process to dynamically query the data, retrieve the data, and visualize the data. In some examples, application of the enhanced RAG process increases both breadth and depth of data exploration and insights generation into the data stored within the graph database. In some examples, application of the enhanced RAG process further increases functionality of the AI language model to address complex user queries requiring understanding of interplay between different data points in the graph database and the corresponding attributes of the different data points.

In some examples, processing circuitry 199 is further configured to execute the AI language model in conjunction with the hybrid AI model that combines graph-based functionality and vector-based functionality to generate structured data queries and predictive outputs informed by the hybrid AI model data model. In some examples, the output returned by the graph-based Natural Language Processing (NLP) system satisfies an increased threshold for the determined user-intent than output returned by the AI language model operating without the hybrid AI model.

In some examples, processing circuitry 199 is further configured to generate the structured data query contextualized against the condensed data structure based on the determined user-intent, by transmitting as input into the AI language model, a specific background or setting, which provides configuration information to guide responses by the AI language model to better align with the determined user-intent and to bias the AI language model to generate as the output, responses that satisfy a relevance threshold, an accuracy threshold, and a usefulness threshold for an application, domain, or user requirement associated with the determined user-intent.

In some examples, the condensed structure is used to fine-tune and to guide the AI language model in producing queries to the graph database which return responses which satisfy one or more of the relevance threshold, the accuracy threshold, and the usefulness threshold.

In some examples, the one or more original data sources comprise at least one of: a private data source; a public data source; a research dataset; a university data source;

a subscription data source; or a private company proprietary data source.

In some examples, processing circuitry 199 is further configured to obtain the data specified for training the AI language model utilizing one or more APIs to perform data cleansing operations on the data.

In some examples, the one or more APIs include at least one of: a first API to perform data transformation operations; a second API to perform data profiling operations; a third API to perform data standardization operations; a fourth API to perform data duplicate detection and removal operations; a fifth API to perform error correction operations; a sixth API to perform error correction operations; a seventh API to perform missing value imputation operations; and an eighth API to perform data validation operations.

In some examples, processing circuitry 199 is further configured to determine, via the AI language model, the data structure for the graph database by either generating a self-defined data structure for the data to be stored within the graph database or obtaining a pre-defined data structure for the data to be stored within the graph database.

In some examples, processing circuitry 199 is further configured to execute instructions for implementing graph-based Natural Language Processing (NLP) for querying, analyzing, and visualizing the data within the graph database contextualized against the condensed data structure based on the determined user-intent from the user-input received in natural human language.

In some examples, processing circuitry 199 is further configured to execute data augmentation operations to supplement the data loaded into the graph database by adding relevant external data to the data in the graph database.

In some examples, the data augmentation operations increase natural language data querying and visualization capabilities of the AI language model.

In some examples, the data augmentation operations are based on one or more of the user-input received by the system or user requests for data augmentation, and data augmentation operations self-identified by the AI language model.

In some examples, the user requests for data augmentation includes user-input specifying a need for data augmentation through natural language input, which the AI language model interprets and understands the context of the user requests.

In some examples, the data augmentation operations self-identified by the AI language model includes a data augmentation processes component configured to self-initiate identification of relevant external data sources to be added to the data in the graph database.

In some examples, processing circuitry 199 is further configured to return with the first output to the user device, second output including visualized data output in the form of one or more charts or graphs self-generated by the AI language model.

In some examples, processing circuitry 199 is further configured to return with the first output to the user device, second output including at least one of a suggested analytics model or a suggested data visualization.

In some examples, the structured data query contextualized against the condensed data structure based on the determined user-intent is provided in a Graph Query Language (GQL) compatible format, selected from any one of: a Cypher compatible structured query;
- a Property Graph Query Language (PGQL) compatible structured query; a G-CORE compatible structured query; and a TigerGraph GSQL compatible structured query.

In some examples, the one or more original data sources comprise at least one of: a csv file; a character delimited text file; a white space delimited text file;
- a relational database; a non-relational database; a privately accessible CRM database;
- free-form unstructured text; and a JSON or XML compatible format retried from an API.

In some examples, processing circuitry 199 is further configured to determine one or more errors are triggered by loading the data extracted from the one or more original data sources into the graph database.

In some examples, processing circuitry 199, responsive to determining the one or more errors are triggered by loading the data extracted from the one or more original data sources into the graph database, loop the one or more errors from the graph database into the AI language model to self-correct the executable load script.

In some examples, processing circuitry 199 iteratively repeats the loop until the data is loaded successfully into the graph database or until a threshold number of attempts is satisfied.

In some examples, processing circuitry 199 determines one or more errors are triggered by the structured data query contextualized against the condensed data structure when submitted to a graph database query engine.

In some examples, processing circuitry 199, responsive to determining the one or more errors are triggered when the structured data query is submitted to the graph database query engine, loops the one or more errors from the graph database query engine into the AI language model to generate a new structured data query contextualized against the condensed data structure based on the previously determined user-intent, the one or more errors triggered when the structured data query is submitted to the graph database query engine, and the previously generated structured data query which resulted in the one or more errors.

In some examples, processing circuitry 199 is further configured to supplement the data specified for training the AI language model with at least one of publicly accessible data and privately accessible data.

In some examples, processing circuitry 199 is further configured to execute an Extract, Transform, Load (ETL) process to retrieve one or more of: privately accessible data from a private organization; publicly accessible data available via a public internet; and publicly accessible pre-defined AI training datasets.

In some examples, processing circuitry 199 is further configured to, prior to loading the data extracted from the one or more original data sources into the graph database, perform data cleansing operations. Such data cleansing operations may include executing data transformation operations to validate compatibility of the data with the graph database. Such data cleansing operations may include executing data profiling operations to identify and correct data quality issues within the data including one or more of missing values, inconsistent values, and anomalous values. Such data cleansing operations may include executing data standardization operations to increase uniformity and consistency across the data. Such data cleansing operations may include executing data duplicate detection and removal operations to ensure detection and removal of duplicate records or values within the data to reduce non-unique values and inaccurate values due to duplication. Such data cleansing operations may include executing error correction operations to identify and correct any identified errors, including one or more of spelling errors, typographical errors, transposition errors, and data entry errors.

Examples: It is Therefore Described in Accordance with the Preceding Description, the Following Examples In accordance with one embodiment, there is a graph-based natural language processing system for querying, analyzing, and visualizing complex data structures. Such an exemplary embodiment includes: an ETL process that extracts data from various data sources and migrates it into a graph database; a condensed data structure generation component that extracts properties, nodes, and relationships from graph database 203; a contextualized GPT-x model that contextualizes the full data architecture of the user or company's data; a tailored natural language processing GPT API that converts natural language input into graph database queries for querying graph database 203; a frontend platform based on popular web development technologies that is connected to a graph database querying engine; a visualization component that includes a series of graph representations such as tables, network graphs, bar charts, pie charts, line charts, maps, single value parameters, raw JSON, markdown, gauge charts, sunburst charts, circle packing charts, treemaps, sankey charts, choropleth maps, and radar charts; an optional machine learning component that provides predictive insights trained on the user or company's data, leveraging the graph structure (e.g., PageRank) for enhanced insights; a data cleansing component that cleans and standardizes the data before it is migrated into graph database 203, with assistance from a configured GPT system of models; a natural language generation component that generates natural language reports and summaries of the data; a customizable web dashboard that allows users to create, modify, and share multiple reports and dashboards through drag-and-drop functionality, producible PDFs, shareable web links, or pure JSON structures; a security component that secures the data stored in graph database 203; a natural language processing component that processes natural language input from the user, including a natural language understanding component that understands the intent of the user's natural language input, and a natural language generation component that generates natural language summaries and reports; a machine learning component that includes a variety of predictive models, such as regression models, classification models, and clustering models; an authentication component that authenticates the user's identity and credentials before allowing access to the system; an authorization component that limits the user's access to the data based on their role and permissions; a backup and recovery component that ensures the data stored in graph database 203 is backed up and can be recovered in the event of a system failure; an audit and logging component that tracks and records user activity in the system; a user interface component that provides a user-friendly interface for the user to interact with the system; a data augmentation component that integrates data from various sources into the system and works with the configured GPT model for understanding the context of a user's request for data augmentation and iteratively incorporating relevant external data into graph database 203.

According to alternative embodiments of the exemplary system, the ETL process extracts data from the source systems and transforms it to be loaded into a graph database.

According to alternative embodiments of the exemplary system, the condensed data structure generation component uses custom queries to extract the properties, nodes, and relationships from graph database 203.

According to alternative embodiments of the exemplary system, the contextualized GPT-x model enables the system to understand and respond accurately to natural language input from the user.

According to alternative embodiments of the exemplary system, the customized language processing module facilitates user's requests to the system by converting natural language input into graph database queries (such as Cypher queries).

According to alternative embodiments of the exemplary system, a web and/or mobile based frontend platform (such as a React/React-Native driven platform) is connected to a graph database querying engine that returns the queried data.

According to alternative embodiments of the exemplary system, the machine learning component includes a variety of predictive models, such as regression models.

According to alternative embodiments of the exemplary system, the authentication component authenticates the user's identity and credentials using various authentication methods, such as single sign-on, two-factor authentication, or biometric authentication.

According to alternative embodiments of the exemplary system, the authorization component limits the user's access to the data based on their role and permissions, and enforces various data policies and standards within the system.

According to alternative embodiments of the exemplary system, the backup and recovery component ensures the data stored in graph database 203 is backed up regularly and can be recovered in the event of a system failure.

According to alternative embodiments of the exemplary system, the audit and logging component tracks and records user activity in the system for auditing and compliance purposes.

According to alternative embodiments of the exemplary system, the user interface component provides a user-friendly interface for the user to interact with the system, including natural language input and drag-and-drop functionality.

According to alternative embodiments of the exemplary system, the data integration component integrates data from various sources, including structured and unstructured data, into the system.

According to alternative embodiments of the exemplary system, the data governance component enforces data policies and standards within the system, including data quality, privacy, and compliance with relevant laws and regulations.

According to alternative embodiments of the exemplary system, the data privacy component ensures the data stored in the system is compliant with data privacy laws and regulations, including GDPR, CCPA, and HIPAA.

According to alternative embodiments of the exemplary system, the natural language processing component includes a natural language understanding component that understands the intent of the user's natural language input and a natural language generation component that generates natural language summaries and reports based on the data structure and user's query.

According to alternative embodiments of the exemplary system, the system can be used in various industries and applications, including healthcare, financial, scientific, marketing, and more, to improve data analysis and visualization.

According to alternative embodiments of the exemplary system, the system provides a user-friendly interface that allows users to easily access and analyze their data, without requiring knowledge of specific query languages or programming skills.

According to alternative embodiments of the exemplary system, the system includes a backup and recovery component that ensures the data stored in graph database 203 is backed up and can be recovered in the event of a system failure.

According to alternative embodiments of the exemplary system, the audit and logging component tracks and records user activity in the system, enabling administrators to monitor system usage and detect any unauthorized access or security breaches.

According to alternative embodiments of the exemplary system, the user interface component provides users with a customizable dashboard that can be tailored to meet their specific needs and requirements.

According to alternative embodiments of the exemplary system, the system is designed to be highly secure, with an authentication component that authenticates the user's identity and credentials before allowing access to the system, and an authorization component that limits the user's access to the data based on their role and permissions.

According to alternative embodiments of the exemplary system, the system uses natural language processing to provide users with a more intuitive and user-friendly way to interact with complex data structures and generate insights and reports based on their queries.

According to alternative embodiments of the exemplary system, the machine learning component provides various predictive models, including regression models, classification models, and clustering models, to help users gain deeper insights into their data.

According to alternative embodiments of the exemplary system, the authentication component ensures that only authorized users with valid credentials can access the system and data stored in the system.

According to alternative embodiments of the exemplary system, the authorization component limits user access to data based on their role and permissions, ensuring that users can only access the data that is relevant to their job function.

According to alternative embodiments of the exemplary system, the system includes a data visualization component that enables users to create custom visualizations of their data, including network graphs, bar charts, treemaps, and pie charts, allowing users to gain insights into their data in a more intuitive and interactive way.

According to alternative embodiments of the exemplary system, the machine learning component provides predictive insights trained on the user or company's data, allowing users to identify patterns and trends in their data that may not be immediately apparent through manual analysis.

According to alternative embodiments of the exemplary system, the system is designed to be scalable and can handle large volumes of data, making it suitable for use by large enterprises with complex data structures and multiple data sources.

According to alternative embodiments of the exemplary system, the system is designed to be customizable, allowing users to create, modify, and share multiple reports and dashboards through drag-and-drop functionality, producible PDFs, shareable web links, or pure JSON structures.

According to alternative embodiments of the exemplary system, the system is designed to be scalable and can handle large and complex data sets, enabling users to perform data analysis and generate reports in real-time.

According to alternative embodiments of the exemplary system, the system provides a comprehensive and customizable solution for data management, analysis, and visualization, utilizing the latest advances in artificial intelligence and natural language processing technologies.

According to alternative embodiments of the exemplary system, the ETL process supports data extraction from various data sources, including relational databases, NoSQL databases, data lakes, and cloud storage, ensuring a seamless integration of data into graph database 203.

According to alternative embodiments of the exemplary system, the natural language processing component utilizes advanced natural language understanding algorithms to accurately interpret and process a wide range of user inputs, including queries, commands, and requests, enabling a more efficient interaction between the user and the system.

According to alternative embodiments of the exemplary system, the condensed data structure generation component is designed to optimize the extraction of relevant information from graph database 203, reducing the computational and storage overhead and improving the overall performance of the system.

According to alternative embodiments of the exemplary system, the customized language processing module (such as a customized ChatGPT API module) leverages the capabilities of the GPT-x model to understand and process natural language input, allowing the system to generate accurate and contextually relevant graph database queries for graph database 203.

According to alternative embodiments of the exemplary system, the frontend platform provides an interactive and responsive user interface, enabling users to visualize and manipulate data in real-time, as well as facilitating seamless collaboration between multiple users through sharing and editing functions.

According to alternative embodiments of the exemplary system, the data cleansing component employs advanced algorithms and techniques to identify and correct inconsistencies, errors, and redundancies in the data, ensuring the quality and reliability of the data stored in graph database 203.

According to alternative embodiments of the exemplary system, the natural language generation component utilizes advanced text generation techniques, such as neural networks and deep learning, to produce accurate, coherent, and contextually relevant natural language summaries and reports based on the user's queries and preferences.

According to alternative embodiments of the exemplary system, the security component employs a multi-layered approach to protect the data stored in graph database 203, including encryption, access control, intrusion detection, and monitoring, ensuring the confidentiality, integrity, and availability of the data.

According to alternative embodiments of the exemplary system, the data governance component provides a centralized framework for managing data policies, standards, and procedures throughout the system, ensuring that the data is managed in a consistent, transparent, and compliant manner.

According to alternative embodiments of the exemplary system, the data privacy component incorporates various privacy-preserving techniques, such as anonymization, pseudonymization, and differential privacy, to protect the privacy of individuals and comply with relevant data protection regulations.

Anonymization is a data processing technique that removes or modifies personally identifiable information; it results in anonymized data that cannot be associated with any one individual.

Pseudonymization is a data management procedure promoted by the European Union's General Data Protection Regulation (GDPR). When data is pseudonymized, the information that can point to the identity of a subject is replaced by "pseudonyms" or identifiers. This prevents the data from specifically pinpointing the user.

According to alternative embodiments of the exemplary system, the natural language processing component is designed to handle complex and ambiguous queries, employing advanced disambiguation techniques and context-aware algorithms to accurately interpret and process user input, providing relevant and precise responses.

According to alternative embodiments of the exemplary system, the graph-based architecture of the system enables efficient querying and analysis of complex data structures, providing users with a more intuitive and effective way of exploring and understanding their data.

According to alternative embodiments of the exemplary system, the machine learning component is designed to continuously learn and adapt to the user's data and preferences, providing personalized and contextually relevant predictive insights, recommendations, and visualizations.

According to alternative embodiments of the exemplary system, the system's modular design allows for the integration of additional components and functionality, such as natural language translation, sentiment analysis, and anomaly detection, enabling the system to cater to the unique needs and requirements of different industries and applications.

According to alternative embodiments of the exemplary system, the customizable web dashboard provides a comprehensive set of visualization tools and features, allowing users to create visually appealing and informative reports and dashboards that effectively communicate insights and findings derived from the data.

According to alternative embodiments of the exemplary system, the system is designed to be adaptable and flexible, allowing for seamless integration with existing data infrastructure, tools, and workflows, facilitating a smooth transition and implementation process for users and organizations.

According to alternative embodiments of the exemplary system, the natural language processing component supports multiple languages and dialects, enabling users from diverse linguistic backgrounds to effectively interact with the system and analyze their data.

According to alternative embodiments of the exemplary system, the performance of the system is optimized to handle real-time data processing and analysis, ensuring that users can access up-to-date information and insights, enabling informed decision-making and timely actions.

According to alternative embodiments of the exemplary system, the audit and logging component is designed to generate comprehensive and detailed audit logs, allowing administrators to effectively monitor user activity, ensure compliance with internal and external policies, and facilitate prompt and accurate incident response.

According to alternative embodiments of the exemplary system, the user interface component is designed with a focus on usability, accessibility, and user experience, providing an intuitive and engaging interface that caters to users with varying levels of technical expertise and experience.

According to alternative embodiments of the exemplary system, the data integration component is designed to support a wide range of data sources, formats, and structures, including traditional databases, data lakes, data warehouses, IoT devices, APIs, structured, semi-structured, and unstructured data, as well as streaming data, ensuring compatibility and seamless integration with diverse data types and structures.

According to alternative embodiments of the exemplary system, the data governance component provides tools and features for monitoring data quality, lineage, and metadata management, enabling users to have a comprehensive understanding of their data assets and maintain control over their data lifecycle.

According to alternative embodiments of the exemplary system, the system is designed to facilitate collaboration and teamwork among users by providing features such as shared dashboards, report commenting, version control, and the ability to share insights, findings, and visualizations with team members and stakeholders, fostering a collaborative and data-driven decision-making process within the organization.

According to alternative embodiments of the exemplary system, the natural language processing component is designed to support domain-specific vocabularies and ontologies, allowing the system to accurately process and interpret user input in specialized industries and applications.

According to alternative embodiments of the exemplary system, the system is designed to be cloud-native, enabling users to access and utilize the system through various devices and platforms, ensuring scalability, flexibility, and cost-efficiency.

According to alternative embodiments of the exemplary system, the system is designed to support extensibility and customization through the use of APIs, plugins, and extensions, allowing users and developers to enhance the system's functionality and adapt it to their specific requirements and preferences.

According to alternative embodiments of the exemplary system, the system's architecture is designed to support horizontal and vertical scaling, ensuring that the system can efficiently handle increasing workloads and growing data volumes without compromising performance or user experience.

According to alternative embodiments of the exemplary system, the system is designed to be platform-independent, allowing users to deploy and use the system on various infrastructures, including on-premises, cloud, and hybrid environments.

According to alternative embodiments of the exemplary system, the system is designed to be compliant with industry-specific regulations and standards, providing users with a reliable and secure solution for data management, analysis, and visualization that adheres to best practices and legal requirements.

According to alternative embodiments of the exemplary system, the system includes a comprehensive set of documentation, tutorials, and support resources, enabling users to quickly learn and effectively utilize the system's features and capabilities.

According to alternative embodiments of the exemplary system, the machine learning component is designed to support transfer learning, allowing users to leverage pre-trained models and adapt them to their specific data and use cases, reducing the time and resources required for training new models from scratch.

According to alternative embodiments of the exemplary system, the system is designed to support automated data pipeline creation and management, enabling users to set up, monitor, and maintain data workflows with case, ensuring consistent and up-to-date data availability.

According to alternative embodiments of the exemplary system, the system incorporates advanced caching and indexing techniques to optimize query performance and reduce the latency of data retrieval and analysis, providing users with a responsive and efficient data exploration experience.

According to alternative embodiments of the exemplary system, the system is designed to be fault-tolerant and resilient, ensuring that the system remains operational and available even in the face of hardware failures, network issues, or other unforeseen disruptions.

According to alternative embodiments of the exemplary system, the system is designed to support integration with popular business intelligence, analytics, and reporting tools, enabling users to leverage the power of the system's natural language processing and graph-based capabilities within their existing data analytics workflows.

According to alternative embodiments of the exemplary system, the system is designed to support real-time monitoring and alerting, enabling users to set up custom alerts and notifications based on specific data events, trends, or anomalies, ensuring timely detection and response to potential issues or opportunities.

According to alternative embodiments of the exemplary system, the system is designed to support a wide range of data visualization formats and interactivity, allowing users to explore and analyze their data through various perspectives and dimensions, fostering a deeper understanding of the underlying patterns and relationships in the data.

According to alternative embodiments of the exemplary system, the system is designed to facilitate data-driven decision-making by providing users with actionable insights, predictive analytics, and contextual recommendations, empowering users to make informed decisions based on their data.

According to alternative embodiments of the exemplary system, the system's modular and flexible architecture enables seamless integration with future technological advancements and improvements in the fields of natural language processing, machine learning, and data management, ensuring the system remains at the forefront of innovation and usability.

According to alternative embodiments of the exemplary system, the system is designed to promote user adoption and engagement through a user-friendly interface, intuitive features, and personalized experiences, encouraging users to leverage the system's capabilities to their full potential.

According to alternative embodiments of the exemplary system, the system is designed to support data sharing and collaboration among users within an organization, as well as with external parties, through secure and controlled access mechanisms, enabling efficient exchange of information and insights while maintaining data privacy and compliance.

According to alternative embodiments of the exemplary system, the system is designed to support multi-tenancy, allowing multiple users or organizations to securely and independently access the system and manage their data, providing a scalable and cost-effective solution for data management, analysis, and visualization.

According to alternative embodiments of the exemplary system, the system is designed to support continuous improvement and optimization through the collection and analysis of usage data, user feedback, and performance metrics, ensuring that the system evolves and adapts to the changing needs and requirements of its users.

According to alternative embodiments of the exemplary system, the system is designed to support a wide range of use cases and applications across various industries, including healthcare, finance, scientific research, marketing, and more, demonstrating the versatility and adaptability of the system to address diverse data analysis and visualization needs.

According to alternative embodiments of the exemplary system, the system is designed with an emphasis on security and data protection, incorporating state-of-the-art encryption, access control, and monitoring mechanisms to safeguard the confidentiality, integrity, and availability of the data stored in the system.

According to alternative embodiments of the exemplary system, the system is designed to support the rapid development and deployment of custom data analysis and visualization solutions, enabling users to quickly respond to changing business requirements and capitalize on new opportunities.

According to alternative embodiments of the exemplary system, the system is designed to facilitate the efficient exploration and analysis of complex, interconnected data structures, providing users with a powerful tool for discovering hidden patterns, trends, and insights within their data.

According to alternative embodiments of the exemplary system, the system is designed to support integration with various third-party tools and services, such as data connectors, visualization libraries, and machine learning frameworks, enhancing the system's capabilities and enabling users to leverage a wide range of resources and technologies.

According to alternative embodiments of the exemplary system, the system is designed to support the implementation of custom algorithms and models for data analysis, visualization, and machine learning, allowing users to tailor the system's functionality to their specific needs and requirements.

According to alternative embodiments of the exemplary system, the system is designed to support flexible deployment options, including on-premises, private cloud, public cloud, and hybrid environments, ensuring that users can select the most suitable infrastructure for their specific needs and constraints.

According to alternative embodiments of the exemplary system, the system is designed to support cross-platform compatibility, enabling users to access and interact with the system through various devices and platforms, such as desktop computers, mobile devices, and web browsers.

According to alternative embodiments of the exemplary system, the system is designed to support advanced data analytics capabilities, such as time series analysis, geospatial analysis, and text mining, providing users with a comprehensive set of tools and techniques for extracting valuable insights from their data.

According to alternative embodiments of the exemplary system, the system is designed to enable users to seamlessly export and import data, visualizations, and reports in various formats, such as CSV, JSON, PDF, and image files, facilitating the sharing and dissemination of data insights and findings.

According to alternative embodiments of the exemplary system, the system is designed to support the efficient management and organization of data assets, including the creation of metadata, data cataloging, and data lineage tracking, ensuring that users can easily locate, access, and understand their data resources.

According to alternative embodiments of the exemplary system, the system is designed to incorporate best practices and guidelines for data management, analysis, and visualization, promoting the adoption of industry standards and ensuring the reliability and validity of the insights generated by the system.

According to alternative embodiments of the exemplary system, the system is designed to support version control and change management, enabling users to track changes to their data, visualizations, and reports, and to easily revert to previous versions or compare different versions to identify discrepancies or improvements.

According to alternative embodiments of the exemplary system, the system is designed to provide a robust and reliable solution for data management, analysis, and visualization, ensuring high availability and performance through the use of redundant infrastructure, load balancing, and fault-tolerance mechanisms.

According to alternative embodiments of the exemplary system, the system is designed to support a wide range of user roles and permissions, enabling organizations to effectively manage access to their data and system features, while ensuring that users can perform their tasks efficiently and securely.

According to alternative embodiments of the exemplary system, the system is designed to support the implementation of custom data pipelines and workflows, enabling users to automate and streamline the process of data ingestion, transformation, analysis, and visualization.

According to alternative embodiments of the exemplary system, the system is designed to support the implementation of custom data validation and quality control mechanisms, enabling users to enforce their data quality standards and ensure the reliability and accuracy of their data.

According to alternative embodiments of the exemplary system, the system is designed to support the development and execution of custom machine learning models and algorithms, enabling users to leverage advanced analytics capabilities tailored to their specific needs and requirements.

According to alternative embodiments of the exemplary system, the system is designed to support advanced data management features, such as data deduplication, data masking, and data archiving, ensuring the efficient and secure storage and management of data assets.

According to alternative embodiments of the exemplary system, the system is designed to provide a comprehensive and user-friendly solution for data management, analysis, and visualization, enabling users to harness the power of natural language processing, graph-based data structures, and machine learning to gain valuable insights from their data.

According to alternative embodiments of the exemplary system, the system is designed to support the integration of various data enrichment and augmentation services, such as geocoding, sentiment analysis, and entity recognition, enhancing the value and context of the data stored in the system.

According to alternative embodiments of the exemplary system, the system is designed to support the implementation of custom alerting and notification mechanisms, enabling users to configure and receive timely alerts based on specific data events or conditions, facilitating proactive decision-making and response.

According to alternative embodiments of the exemplary system, the system is designed to support a wide range of data transformation and preprocessing operations, such as aggregation, normalization, and filtering, enabling users to efficiently process and prepare their data for analysis and visualization.

According to alternative embodiments of the exemplary system, the system is designed to provide users with a comprehensive set of tools and resources for learning, support, and troubleshooting, including tutorials, documentation, and community forums, ensuring that users can effectively utilize the system's capabilities and resolve any issues they may encounter.

According to alternative embodiments of the exemplary system, the system is designed to support the deployment and execution of user-defined functions, scripts, and applications, enabling users to extend the functionality of the system and integrate their custom solutions with the system's core features and capabilities.

According to alternative embodiments of the exemplary system, the system is designed to support the implementation of custom data retention policies and archiving strategies, ensuring that data is stored and managed in compliance with organizational requirements and regulatory obligations.

According to alternative embodiments of the exemplary system, the system is designed to support the efficient and secure sharing of data, visualizations, and insights among users within an organization, as well as with external stakeholders, through the use of access controls, encryption, and secure sharing mechanisms.

According to alternative embodiments of the exemplary system, the system is designed to provide a robust and flexible foundation for the development and deployment of custom data-driven applications, services, and solutions, enabling organizations to leverage the power of natural language processing, graph-based data structures, and machine learning to address a wide range of business challenges and opportunities.

According to alternative embodiments of the exemplary system, the system is designed to support the integration of advanced analytics features, such as OLAP (Online Analytical Processing) and statistical analysis, providing users with a comprehensive set of tools for exploring, analyzing, and understanding their data.

According to alternative embodiments of the exemplary system, the system is designed to support the implementation of custom data security and privacy policies, ensuring that the system is compliant with industry standards, best practices, and regulatory requirements, such as GDPR, CCPA, and HIPAA.

According to alternative embodiments of the exemplary system, the system is designed to support the integration of external data sources and APIs, enabling users to import and analyze data from a wide range of sources, including social media platforms, web analytics services, and third-party databases.

According to alternative embodiments of the exemplary system, the system is designed to support the development and execution of custom data processing tasks and pipelines, allowing users to automate and streamline data ingestion, transformation, and analysis operations.

According to alternative embodiments of the exemplary system, the system is designed to support the efficient management and organization of reports, dashboards, and visualizations, enabling users to easily search, filter, and categorize their data assets, facilitating quick and easy access to relevant information.

According to alternative embodiments of the exemplary system, the system is designed to support the implementation of custom data tagging and labeling mechanisms, enabling users to categorize and annotate their data assets, improving the discoverability and context of their data.

According to alternative embodiments of the exemplary system, the system is designed to support the integration of advanced data access control mechanisms, such as role-based access control (RBAC) and attribute-based access control (ABAC), ensuring that users can securely and efficiently manage access to their data assets.

According to alternative embodiments of the exemplary system, the system is designed to provide users with a powerful and intuitive platform for exploring and analyzing complex, interconnected data structures, empowering users to uncover hidden patterns, trends, and insights within their data, and facilitating data-driven decision-making and action.

According to alternative embodiments of the exemplary system, the system is designed to support the implementation of custom performance optimization techniques, such as query optimization, caching, and parallel processing, ensuring that users can efficiently analyze and visualize large volumes of data without compromising system performance.

According to alternative embodiments of the exemplary system, the system is designed to support the continuous monitoring and evaluation of system performance, enabling administrators to identify and address potential bottlenecks, performance issues, and areas for improvement.

According to alternative embodiments of the exemplary system, the system is designed to support the integration of machine learning and artificial intelligence techniques, such as reinforcement learning and neural networks, enabling users to harness cutting-edge technologies and methodologies for data analysis and prediction.

According to alternative embodiments of the exemplary system, the system is designed to support the seamless integration of new features, enhancements, and updates, ensuring that users can benefit from ongoing improvements and advancements in the fields of natural language processing, graph-based data structures, and machine learning.

According to alternative embodiments of the exemplary system, the system is designed to support the incorporation of user feedback and suggestions into the development and enhancement of the system, fostering a user-centric approach to system design and functionality.

According to alternative embodiments of the exemplary system, the system is designed to support a wide range of user roles, including data analysts, data scientists, business analysts, decision-makers, and IT administrators, providing a comprehensive and versatile solution for organizations with diverse data analysis and management needs.

According to alternative embodiments of the exemplary system, the system is designed to provide a user-friendly, efficient, and powerful solution for data management, analysis, and visualization, harnessing the power of natural language processing, graph-based data structures, and machine learning technologies to enable users to gain valuable insights and make informed decisions based on their data.

According to alternative embodiments of the exemplary system, the system is designed to support the implementation of custom data processing and analysis workflows, allowing users to create, modify, and execute tailored data pipelines that align with their specific needs and requirements.

According to alternative embodiments of the exemplary system, the system is designed to support the integration of data validation and verification mechanisms, ensuring that data is accurate, consistent, and reliable before being ingested, processed, and analyzed by the system.

According to alternative embodiments of the exemplary system, the system is designed to support the secure storage and management of sensitive data, incorporating encryption-at-rest and encryption-in-transit mechanisms to protect data confidentiality and integrity.

According to alternative embodiments of the exemplary system, the system is designed to support the implementation of custom data retention and disposal policies, enabling organizations to comply with data storage and disposal requirements stipulated by industry regulations, legal obligations, or organizational policies.

According to alternative embodiments of the exemplary system, the system is designed to support the integration of third-party data analytics, visualization, and reporting tools, enabling users to leverage a diverse ecosystem of tools and technologies to enhance their data analysis and visualization capabilities.

According to alternative embodiments of the exemplary system, the system is designed to support the implementation of custom user interface components and themes, enabling users to customize the look and feel of the system to align with their organizational branding, preferences, and requirements.

According to alternative embodiments of the exemplary system, the system is designed to support the implementation of custom data connectors, enabling users to easily integrate data from various sources, including proprietary or legacy systems, into the graph-based natural language processing system.

According to alternative embodiments of the exemplary system, the system is designed to support the development and implementation of custom machine learning models, enabling users to train and deploy models tailored to their specific data and use cases, enhancing the system's predictive and analytical capabilities.

According to alternative embodiments of the exemplary system, the system is designed to support advanced data analytics techniques, such as anomaly detection, outlier analysis, and statistical modeling, providing users with a comprehensive set of tools for uncovering valuable insights within their data.

According to alternative embodiments of the exemplary system, the system is designed to provide a scalable, flexible, and adaptable solution for data management, analysis, and visualization, empowering users to harness the power of natural language processing, graph-based data structures, and machine learning to effectively address a wide range of data-related challenges and opportunities.

According to alternative embodiments of the exemplary system, the system is designed to support the integration of various data preprocessing techniques, such as feature extraction, feature selection, and feature scaling, as well as the implementation of custom data transformation and manipulation functions, enabling users to efficiently prepare, process, clean, and transform their data for machine learning, advanced analytics tasks, and effective analysis and visualization.

According to alternative embodiments of the exemplary system, the system is designed to support the implementation of custom access control policies and security configurations, as well as the integration of various data security and privacy features, such as data masking, pseudonymization, and access control, ensuring that users can manage and secure their data assets in accordance with industry standards, best practices, regulatory requirements, and comply with data protection regulations and best practices.

According to alternative embodiments of the exemplary system, the system is designed to support the integration of data quality assessment and monitoring tools, as well as the implementation of custom data quality assessment and improvement strategies, enabling users to continuously monitor, evaluate, and enhance the quality of their data assets as they are ingested, processed, and analyzed by the system.

According to alternative embodiments of the exemplary system, the system is designed to support the integration of data lineage and provenance tracking tools, enabling users to track the origins, transformations, and dependencies of their data assets, ensuring transparency and trust in the data and insights generated by the system.

According to alternative embodiments of the exemplary system, the system is designed to support the implementation of custom alerting, monitoring, and reporting mechanisms, enabling users to efficiently track, analyze, and respond to system performance, data quality issues, and other relevant events.

According to alternative embodiments of the exemplary system, the system is designed to support the integration of advanced data search and discovery tools, as well as various data cataloging and metadata management tools, enabling users to efficiently locate, access, and explore their data assets through intuitive and context-aware search and filtering mechanisms, create, maintain, and search a comprehensive catalog of their data assets, thereby improving data discoverability, understanding, and facilitating quick and easy access to relevant information.

According to alternative embodiments of the exemplary system, the system is designed to support the implementation of custom data tagging and metadata management features, as well as the integration of various data collaboration and sharing tools, such as commenting, annotation, and version control, enabling users to efficiently organize, annotate, and manage their data assets, fostering a collaborative and data-driven decision-making environment within the organization, and improving the discoverability, context, and understanding of their data.

According to alternative embodiments of the exemplary system, the system is designed to support the development and implementation of custom data ingestion and integration workflows, allowing users to automate and streamline the process of collecting, transforming, and loading data from multiple sources into the graph-based natural language processing system.

According to alternative embodiments of the exemplary system, the system is designed to support the implementation of custom error handling and exception management mechanisms, ensuring the system's robustness and reliability in the face of unexpected events or failures.

According to alternative embodiments of the exemplary system, the system is designed to support the integration of advanced data aggregation and summarization techniques, enabling users to efficiently generate high-level overviews and summaries of their data, facilitating the communication and understanding of complex data structures and insights.

According to alternative embodiments of the exemplary system, the system is designed to support the implementation of custom performance monitoring, benchmarking, and optimization strategies, enabling users to continuously evaluate and improve the efficiency, scalability, and reliability of the system, as well as compare the performance of their system with industry standards, best practices, and competitors, driving continuous improvement and optimization efforts.

According to alternative embodiments of the exemplary system, the system is designed to support the integration of various machine learning and artificial intelligence libraries and frameworks, as well as advanced data modeling techniques, such as predictive modeling, clustering, and classification, enabling users to leverage state-of-the-art algorithms and techniques for data analysis, prediction, optimization, and to create and deploy custom machine learning models that provide valuable insights, predictions, and recommendations based on their data.

According to alternative embodiments of the exemplary system, the system is designed to support the implementation of custom data visualization components, layouts, and interactivity features, as well as the integration of various data visualization libraries and tools, such as D3.js, Plotly, and Tableau, enabling users to create visually appealing, informative, engaging, visually stunning, interactive, and customizable visualizations that effectively communicate insights, findings, and data insights derived from the data.

According to alternative embodiments of the exemplary system, the system is designed to support the integration of advanced text analytics capabilities, such as entity extraction, sentiment analysis, and topic modeling, enabling users to derive valuable insights from unstructured text data.

According to alternative embodiments of the exemplary system, the system is designed to support the implementation of custom data export and import capabilities, enabling users to easily exchange data, visualizations, and reports between the system and other tools, platforms, or formats.

According to alternative embodiments of the exemplary system, the system is designed to support the integration of various data storage and management technologies, such as relational databases, NoSQL databases, data warehouses, and distributed file systems, ensuring compatibility and seamless integration with a diverse set of data sources and structures.

According to alternative embodiments of the exemplary system, the system is designed to support the development and execution of custom scripts, functions, and applications that leverage the system's natural language processing, graph-based data structures, and machine learning capabilities, enabling users to create tailored solutions that address their specific data-related challenges and requirements.

According to alternative embodiments of the exemplary system, the system is designed to provide a secure, reliable, and efficient solution for data management, analysis, and visualization, incorporating industry-standard security mechanisms, fault-tolerance techniques, and performance optimization strategies, ensuring that users can confidently rely on the system for their data-related needs and tasks.

According to alternative embodiments of the exemplary system, the system is designed to support the implementation of custom notification and communication features, enabling users to receive timely updates, alerts, and messages related to their data, system events, or collaboration activities, fostering effective communication and collaboration among users and stakeholders.

According to alternative embodiments of the exemplary system, the system is designed to support the implementation of custom user management and authentication mechanisms, such as single sign-on (SSO) and multi-factor authentication (MFA), ensuring the security and integrity of user accounts and access to the system.

According to alternative embodiments of the exemplary system, the system is designed to support the integration of various data processing and analysis libraries, frameworks, and tools, enabling users to leverage a diverse ecosystem of resources and technologies to enhance their data analysis and visualization capabilities.

According to alternative embodiments of the exemplary system, the system is designed to provide an extensible, modular, and adaptable platform for the development and deployment of data-driven applications, services, and solutions that harness the power of natural language processing, graph-based data structures, and machine learning to address a wide range of business challenges and opportunities.

According to alternative embodiments of the exemplary system, the system is designed to support the implementation of custom algorithms for data pre-processing, cleaning, and normalization, ensuring that the data stored in graph database 203 is accurate, consistent, and suitable for analysis and visualization tasks.

According to alternative embodiments of the exemplary system, the system is designed to support the implementation of custom data backup and recovery mechanisms, ensuring that users can efficiently and securely restore their data assets in the event of data loss or system failures.

According to alternative embodiments of the exemplary system, the system is designed to support the integration of advanced data exploration and discovery techniques, such as interactive data mining, pattern recognition, and visual analytics, enabling users to uncover hidden relationships, trends, and insights within their data.

According to alternative embodiments of the exemplary system, the system is designed to provide a comprehensive, user-friendly, and effective solution for data management, analysis, and visualization, empowering users to harness the power of natural language processing, graph-based data structures, and machine learning technologies to gain valuable insights and make data-driven decisions.

According to alternative embodiments of the exemplary system, the system is designed to support the implementation of custom data transformation logic, such as joins, aggregations, and pivoting operations, allowing users to manipulate and restructure their data for specific analysis and visualization objectives.

According to alternative embodiments of the exemplary system, the system is designed to support the integration of various data streaming and real-time analytics technologies, enabling users to process, analyze, and visualize data in real-time, facilitating timely decision-making and actions based on current data.

According to alternative embodiments of the exemplary system, the system is designed to support the implementation of custom data governance policies and procedures, ensuring that data is managed in a consistent, transparent, and compliant manner across the organization.

According to alternative embodiments of the exemplary system, the system is designed to support the integration of various data quality and consistency checks, such as data profiling, anomaly detection, and outlier analysis, enabling users to identify and address data quality issues and ensure the reliability of their data assets.

According to alternative embodiments of the exemplary system, the system is designed to support the integration of advanced data compression and storage optimization techniques, ensuring efficient storage and retrieval of data assets while minimizing storage costs and resource requirements.

According to alternative embodiments of the exemplary system, the system is designed to support the implementation of custom data lifecycle management strategies, enabling users to effectively manage the entire data lifecycle, from data creation and ingestion to archiving and disposal.

According to alternative embodiments of the exemplary system, the system is designed to support the implementation of custom user onboarding and training resources, such as tutorials, documentation, and interactive guides, ensuring that users can quickly and effectively learn and utilize the system's capabilities.

According to alternative embodiments of the exemplary system, the system is designed to provide a flexible, scalable, and future-proof solution for data management, analysis, and visualization, enabling users to adapt and evolve their data strategies in response to changing business needs, technologies, and market conditions.

According to alternative embodiments of the exemplary system, the system is designed to support the implementation of custom data synchronization and replication mechanisms, ensuring that data remains consistent and up-to-date across multiple systems, locations, and environments.

According to alternative embodiments of the exemplary system, the system is designed to support the integration of various data processing and analytics engines, such as Spark, Hadoop, and Flink, enabling users to leverage a diverse ecosystem of technologies for distributed data processing and large-scale analytics.

According to alternative embodiments of the exemplary system, the system is designed to support the implementation of custom resource management and allocation strategies, ensuring that the system can efficiently handle varying workloads and resource demands while maintaining optimal performance and user experience.

According to alternative embodiments of the exemplary system, the system is designed to support the integration of various data extraction, transformation, and loading (ETL) tools and technologies, enabling users to efficiently and accurately ingest and process data from a wide range of sources, formats, and structures into the graph-based natural language processing system.

According to alternative embodiments of the exemplary system, the system is designed to support the implementation of custom data partitioning and sharding mechanisms, ensuring that data is stored and distributed across the system in a manner that optimizes query performance, data retrieval, and system scalability.

According to alternative embodiments of the exemplary system, the system is designed to support the integration of various machine learning model management and deployment tools, such as model versioning, monitoring, and rollback capabilities, enabling users to effectively manage the lifecycle of their custom machine learning models and ensure their continued performance and relevance.

According to alternative embodiments of the exemplary system, said system includes a feedback loop mechanism between the GPT-x model and graph database querying engine 207, such that errors returned by the querying engine are passed to the GPT-x model, which then attempts to refine the query to prevent subsequent failures.

According to alternative embodiments of the exemplary system, said GPT-x model includes a specific model dedicated to receiving error feedback and refining queries based on the received feedback to improve the system's reliability and accuracy.

According to alternative embodiments of the exemplary system, the system further includes a user feedback mechanism allowing users to provide input on system performance, query results, and encountered issues.

According to alternative embodiments of the exemplary system, the user feedback is integrated into the GPT-x model's learning process to enhance its understanding of user intent, preferences, and data structure intricacies.

According to alternative embodiments of the exemplary system, the feedback loop mechanism dynamically adapts to the needs and requirements of users and data structures, thereby continuously improving system performance and accuracy over time.

According to alternative embodiments of the exemplary system, said feedback loop mechanism contributes to the system's scalability, flexibility, and adaptability, allowing it to better address the complex data analysis and visualization needs of users across various industries and applications.

According to alternative embodiments of the exemplary system, the system is configured to dynamically iterate through the graph and append external relevant data driven by a user's prompting, enhancing the system's adaptability and customization to specific user requirements while complementing the primary components and functionalities of the disclosure.

According to alternative embodiments of the exemplary system, the configured GPT model assists in the data cleansing process during the ETL process by detecting and correcting errors, standardizing formats, and removing duplicates.

According to alternative embodiments of the exemplary system, the data augmentation process retrieves relevant existing data from graph database 203 and leverages the configured GPT model to organize the data and generate the appropriate query language for importing the data into the existing data structure.

According to alternative embodiments of the exemplary system, the data augmentation process is initiated based on a user's request through the frontend platform.

According to alternative embodiments of the exemplary system, the data augmentation process improves the accuracy and reliability of the data within graph database 203 by incorporating additional data sources.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A system comprising:
   processing circuitry;
   non-transitory computer readable media storing instructions that, when executed by the processing circuitry, configure the processing circuitry to:
   execute an AI language model;
   specify data for training the AI language model available from one or more original data sources;
   migrate the data specified for training the AI language model from the one or more original data sources into a graph database by exposing the one or more original data sources to the AI language model and performing at least the following data migration operations:
   determine, via the AI language model, a data structure for the graph database;
   generate, via the AI language model, an executable query script having self-written code to extract the data from the one or more original data sources exposed to the AI language model as extracted data;
   execute the executable query script to extract the extracted data from the one or more original data sources;
   generate, via the AI language model, an executable load script having self-written code to load the extracted data extracted from the one or more original data sources into the data structure of the graph database as new nodes and new relationships with directionality between the new nodes and having metadata parameters within the new nodes describing the extracted data loaded into the graph database;
   execute the executable load script to load the extracted data extracted from the one or more original data sources into the graph database as loaded data;
   condense the loaded data stored within the graph database into a condensed data structure representing a full architecture of the loaded data in a natural language format by performing at least the following data condensing operations:
   query the graph database to obtain information on the new nodes, the new relationships, and the metadata parameters within the graph database;

provide as input to the AI language model, the information on the new nodes, the new relationships, and the metadata parameters; and responsive to providing as input to the AI language model, the information on the new nodes, the new relationships, and the metadata parameters, generate as output from the AI language model, the condensed data structure;

receive a question as user-input in natural human language;

execute the AI language model to determine a user-intent from the user-input;

execute the AI language model to generate a structured data query contextualized against the condensed data structure based on the determined user-intent;

execute the structured data query against the graph database; and return output in a structured format to a user-device having originated the user-input.

2. The system of claim 1, wherein the processing circuitry is further configured to generate the structured data query contextualized against the condensed data structure based on the determined user-intent, by transmitting as input into the AI language model, a specific background or setting, which provides configuration information to guide responses by the AI language model to better align with the determined user-intent and to bias the AI language model to generate as the output, responses that satisfy a relevance threshold, an accuracy threshold, and a usefulness threshold for an application, domain, or user requirement associated with the determined user-intent; and wherein the condensed structure is used to fine-tune and to guide the AI language model in producing queries to the graph database which return responses which satisfy one or more of the relevance threshold, the accuracy threshold, and the usefulness threshold.

3. The system of claim 1, wherein the one or more original data sources comprise at least one of:
a private data source;
a public data source;
a research dataset;
a university data source;
a subscription data source; or
a private company proprietary data source.

4. The system of claim 1, wherein the processing circuitry is further configured to:
obtain the data specified for training the AI language model utilizing one or more APIs to perform data cleansing operations on the data, wherein one or more APIs include at least one of:
a first API to perform data transformation operations;
a second API to perform data profiling operations;
a third API to perform data standardization operations;
a fourth API to perform data duplicate detection and removal operations;
a fifth API to perform error correction operations;
a sixth API to perform error correction operations;
a seventh API to perform missing value imputation operations; and
an eighth API to perform data validation operations.

5. The system of claim 1, wherein the processing circuitry is further configured to:
determining, via the AI language model, the data structure for the graph database by either generating a self-defined data structure for the extracted data to be stored within the graph database or obtaining a pre-defined data structure for the extracted data to be stored within the graph database.

6. The system of claim 1, wherein the processing circuitry is further configured to:
execute instructions for implementing graph-based Natural Language Processing (NLP) for querying, analyzing, and visualizing the loaded data within the graph database contextualized against the condensed data structure based on the determined user-intent from the user-input received in natural human language.

7. The system of claim 1, wherein the processing circuitry is further configured to:
execute data augmentation operations to supplement the loaded data loaded into the graph database by adding relevant external data to the loaded data in the graph database;
wherein the data augmentation operations increase natural language data querying and visualization capabilities of the AI language model;
wherein the data augmentation operations are based on one or more of the user-input received by the system or user requests for data augmentation, and data augmentation operations self-identified by the AI language model;
wherein the user requests for data augmentation includes user-input specifying a need for data augmentation through natural language input, which the AI language model interprets and understands the context of the user requests; and
wherein the data augmentation operations self-identified by the AI language model includes a data augmentation processes component configured to self-initiate identification of relevant external data sources to be added to the loaded data in the graph database.

8. The system of claim 1, wherein the processing circuitry is further configured to:
return with the output to the user device, second output including visualized data output in the form of one or more charts or graphs self-generated by the AI language model.

9. The system of claim 1, wherein the processing circuitry is further configured to:
return with the output to the user device, second output including at least one of a suggested analytics model or a suggested data visualization.

10. The system of claim 1, wherein the structured data query contextualized against the condensed data structure based on the determined user-intent is provided in a Graph Query Language (GQL) compatible format, selected from any one of:
a Cypher compatible structured query;
a Property Graph Query Language (PGQL) compatible structured query;
a G-CORE compatible structured query; and
a TigerGraph GSQL compatible structured query.

11. The system of claim 1, wherein the one or more original data sources comprise at least one of:
a csv file;
a character delimited text file;
a white space delimited text file;
a relational database;
a non-relational database;
a privately accessible CRM database;
free-form unstructured text; and
a JSON or XML compatible format retried from an API.

12. The system of claim 1, wherein the processing circuitry is further configured to:
    determine one or more errors are triggered by loading the extracted data extracted from the one or more original data sources into the graph database;
    responsive to determining the one or more errors are triggered by loading the extracted data extracted from the one or more original data sources into the graph database, loop the one or more errors from the graph database into the AI language model to self-correct the executable load script; and
    iteratively repeat the loop until the extracted data is loaded successfully into the graph database or until a threshold number of attempts is satisfied.

13. The system of claim 1, wherein the processing circuitry is further configured to:
    determine one or more errors are triggered by the structured data query contextualized against the condensed data structure when submitted to a graph database query engine; and
    responsive to determining the one or more errors are triggered when the structured data query is submitted to the graph database query engine, loop the one or more errors from the graph database query engine into the AI language model to generate a new structured data query contextualized against the condensed data structure based on the previously determined user-intent, the one or more errors triggered when the structured data query is submitted to the graph database query engine, and the previously generated structured data query which resulted in the one or more errors.

14. The system of claim 1, wherein the processing circuitry is further configured to:
    supplement the data specified for training the AI language model with at least one of publicly accessible data and privately accessible data.

15. The system of claim 1, wherein the processing circuitry is further configured to:
    execute an Extract, Transform, Load (ETL) process to retrieve one or more of:
    privately accessible data from a private organization;
    publicly accessible data available via a public internet; and
    publicly accessible pre-defined AI training datasets.

16. The system of claim 1, wherein the processing circuitry is further configured to:
    prior to loading the extracted data extracted from the one or more original data sources into the graph database, perform data cleansing operations including:
    execute data transformation operations to validate compatibility of the extracted data with the graph database;
    execute data profiling operations to identify and correct data quality issues within the extracted data including one or more of missing values, inconsistent values, and anomalous values;
    execute data standardization operations to increase uniformity and consistency across the extracted data;
    execute data duplicate detection and removal operations to ensure detection and removal of duplicate records or values within the extracted data to reduce non-unique values and inaccurate values due to duplication; and
    execute error correction operations to identify and correct any identified errors, including one or more of spelling errors, typographical errors, transposition errors, and data entry errors.

17. The system of claim 1, wherein the system is a graph-based Natural Language Processing (NLP) system; and
    executing a hybrid AI model that combines graph-based functionality and vector-based functionality to increase data querying, data retrieval, and data visualization capabilities of the system.

18. The system of claim 17, wherein the processing circuitry is further configured to:
    append attribute data to the new nodes within the graph database;
    wherein the attribute data includes one or more of:
    metadata describing the loaded data;
    context-specific information for the loaded data;
    first vector embeddings representing semantic meaning of the loaded data; and
    second vector embeddings representing relation of a first data point within the loaded data to a second one or more data points within the loaded data stored to the graph database.

19. The system of claim 18, wherein the processing circuitry is further configured to:
    utilize the attribute data appended to the new nodes within the graph database to augment data retrieval of the loaded data from the graph database;
    wherein the attribute data appended to the new nodes enables the system to execute queries with increased fidelity that consider both the data structure for the graph database and semantic relationships encapsulated within the first vector embeddings of the attribute data; and
    wherein use of the semantic relationships encapsulated within the first vector embeddings of the attribute data enable deeper analysis into the loaded data and more comprehensive exploration of the loaded data than without use of the semantic relationships.

20. The system of claim 19, wherein the processing circuitry is further configured to:
    apply an enhanced Retrieval-Augmented Generation (RAG) process to dynamically query the loaded data, retrieve at least a portion of the loaded data, and visualize at least the portion of the loaded data;
    wherein application of the enhanced RAG process increases both breadth and depth of data exploration and insights generation into the loaded data stored within the graph database; and
    wherein application of the enhanced RAG process further increases functionality of the AI language model to address complex user queries requiring understanding of interplay between different data points in the graph database and the corresponding attributes of the different data points.

21. The system of claim 20, wherein the processing circuitry is further configured to:
    execute the AI language model in conjunction with the hybrid AI model that combines graph-based functionality and vector-based functionality to generate structured data queries and predictive outputs informed by the hybrid AI model data model; and
    wherein the output returned by the system satisfies an increased threshold for the determined user-intent than output returned by the AI language model operating without the hybrid AI model.

22. A computer-implemented method comprising:
    executing an AI language model;
    specifying data for training the AI language model available from one or more original data sources;

migrating the data specified for training the AI language model from the one or more original data sources into a graph database by exposing the one or more original data sources to the AI language model and performing at least the following data migration operations:
  determining, via the AI language model, a data structure for the graph database;
  generating, via the AI language model, an executable query script having self-written code to extract the data from the one or more original data sources exposed to the AI language model as extracted data;
  executing the executable query script to extract the extracted data from the one or more original data sources;
  generating, via the AI language model, an executable load script having self-written code to load the extracted data extracted from the one or more original data sources into the data structure of the graph database as new nodes and new relationships with directionality between the new nodes and having metadata parameters within the new nodes describing the extracted data loaded into the graph database;
  executing the executable load script to load the extracted data extracted from the one or more original data sources into the graph database as loaded data;
condensing the loaded data stored within the graph database into a condensed data structure representing a full architecture of the loaded data in a natural language format by performing at least the following data condensing operations:
  querying the graph database to obtain information on the new nodes, the new relationships, and the metadata parameters within the graph database;
  providing as input to the AI language model, the information on the new nodes, the new relationships, and the metadata parameters; and
  responsive to providing as input to the AI language model, the information on the new nodes, the new relationships, and the metadata parameters, generating as output from the AI language model, the condensed data structure;
receiving a question as user-input in natural human language;
executing the AI language model to determine a user-intent from the user-input;
executing the AI language model to generate a structured data query contextualized against the condensed data structure based on the determined user-intent;
executing the structured data query against the graph database; and
returning output in a structured format to a user-device having originated the user-input.

23. Non-transitory computer readable storage media comprising instructions that, when executed, configure processing circuitry to:
execute an AI language model;
specify data for training the AI language model available from one or more original data sources;
migrate the data specified for training the AI language model from the one or more original data sources into a graph database by exposing the one or more original data sources to the AI language model and performing at least the following data migration operations:
  determine, via the AI language model, a data structure for the graph database;
  generate, via the AI language model, an executable query script having self-written code to extract the data from the one or more original data sources exposed to the AI language model as extracted data;
  execute the executable query script to extract the extracted data from the one or more original data sources;
  generate, via the AI language model, an executable load script having self-written code to load the extracted data extracted from the one or more original data sources into the data structure of the graph database as new nodes and new relationships with directionality between the new nodes and having metadata parameters within the new nodes describing the extracted data loaded into the graph database;
  execute the executable load script to load the extracted data extracted from the one or more original data sources into the graph database as loaded data;
condense the loaded data stored within the graph database into a condensed data structure representing a full architecture of the loaded data in a natural language format by performing at least the following data condensing operations:
  query the graph database to obtain information on the new nodes, the new relationships, and the metadata parameters within the graph database;
  provide as input to the AI language model, the information on the new nodes, the new relationships, and the metadata parameters; and
  responsive to providing as input to the AI language model, the information on the new nodes, the new relationships, and the metadata parameters, generate as output from the AI language model, the condensed data structure;
receive a question as user-input in natural human language;
execute the AI language model to determine a user-intent from the user-input;
execute the AI language model to generate a structured data query contextualized against the condensed data structure based on the determined user-intent;
execute the structured data query against the graph database; and
return output in a structured format to a user-device having originated the user-input.

* * * * *